US012657391B2

(12) United States Patent
Rashidi et al.

(10) Patent No.: US 12,657,391 B2
(45) Date of Patent: Jun. 16, 2026

(54) SYSTEMS, METHODS, AND APPARATUSES FOR DETECTING SENSITIVE TERMS IN DATA

(71) Applicant: Comcast Cable Communications, LLC, Philadelphia, PA (US)

(72) Inventors: Bahman Rashidi, Malvern, PA (US); Sandhya Baskaran, Chennai (IN); Vaibhav Garg, Blacksburg, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 174 days.

(21) Appl. No.: 18/371,667

(22) Filed: Sep. 22, 2023

(65) Prior Publication Data

US 2025/0103817 A1 Mar. 27, 2025

(51) Int. Cl.
*G06F 40/30* (2020.01)
*G06F 40/279* (2020.01)

(52) U.S. Cl.
CPC ............ *G06F 40/30* (2020.01); *G06F 40/279* (2020.01)

(58) Field of Classification Search
CPC ...... G06F 40/30; G06F 40/279; G06F 40/284; G06F 40/289; G06F 21/6245; G06F 21/602; G06N 20/00; H04L 63/1425; H04L 63/1433
See application file for complete search history.

(56) References Cited

U.S. PATENT DOCUMENTS

| | | | | |
|---|---|---|---|---|
| 11,756,049 B1 * | 9/2023 | Shankar | ............. | G06Q 30/0206 |
| | | | | 705/7.35 |
| 2002/0161875 A1 * | 10/2002 | Raymond | ............... | H04L 41/18 |
| | | | | 709/223 |
| 2018/0060302 A1 * | 3/2018 | Liang | ...................... | G06F 16/35 |
| 2018/0173698 A1 * | 6/2018 | Dubey | ............... | G06F 16/3347 |
| 2019/0303796 A1 * | 10/2019 | Balasubramanian | .... | G06N 7/01 |
| 2020/0125639 A1 * | 4/2020 | Doyle | ...................... | G06N 3/08 |
| 2020/0336501 A1 * | 10/2020 | Lewis | ................. | G06F 21/6263 |

FOREIGN PATENT DOCUMENTS

| | | | | | |
|---|---|---|---|---|---|
| CN | 112800465 A | * | 5/2021 | ......... | G06F 21/6245 |
| CN | 115544240 A | * | 12/2022 | ............. | G06F 40/30 |

* cited by examiner

*Primary Examiner* — Yogeshkumar Patel
(74) *Attorney, Agent, or Firm* — Ballard Spahr LLP

(57) ABSTRACT

Methods, systems, and apparatuses are provided for predicting if an item of text data includes one or more sensitive terms. An item of text data may be received by a computing device from a second computing device associated with a user. The computing device may determine one or more words within the item of text data. An arrangement of the one or more words may be determined. The arrangement of the one or more words may be based on an assignment bearing vectorization of the item of text data and/or a position bearing vectorization of the item of text data. Based on the arrangement of the one or more words within the item of text data, the computing device may determine a potential sensitive term within the item of text data. The computing device may cause an output of an indication of the potential sensitive term.

21 Claims, 10 Drawing Sheets

1100

1110

RECEIVE TEXT DATA

1120

DETERMINE ONE OR MORE WORDS IN THE TEXT DATA

1130

DETERMINE, BASED ON AN ARRANGEMENT OF THE ONE OR MORE WORDS, A POTENTIAL SENSITIVE TERM IN THE TEXT DATA

1140

CAUSING OUTPUT OF AN INDICATION OF THE POTENTIAL SENSITIVE TERM

1200

1210
RECEIVE TEXT DATA

1220
DETERMINE ONE OR MORE WORDS IN THE TEXT DATA

1230
DETERMINE, BASED ON A POSITION OF THE ONE OR MORE WORDS IN THE TEXT DATA, A POTENTIAL SENSITIVE TERM IN THE TEXT DATA

1240
CAUSING OUTPUT OF AN INDICATION OF THE POTENTIAL SENSITIVE TERM

1300

1310
RECEIVE TEXT DATA

1320
DETERMINE ONE OR MORE WORDS IN THE TEXT DATA

1330
DETERMINE, BASED ON THE ONE OR MORE WORDS AND A TRAINED MODEL, A POTENTIAL SENSITIVE TERM IN THE TEXT DATA

1340
CAUSING OUTPUT OF AN INDICATION OF THE POTENTIAL SENSITIVE TERM

SYSTEMS, METHODS, AND APPARATUSES FOR DETECTING SENSITIVE TERMS IN DATA

BACKGROUND

A programmer or developer generates lines of text when drafting computer code for one or more computer products. These lines of text (e.g., lines of code) may be input by the programmer/developer and stored within the base of the code. Once the code is completed, a quality control review may determine that the code includes one or more sensitive terms (e.g., secrets, confidential information, passwords, etc.) that should not be included in the code. Modifying the code at that point to remove the sensitive terms can be a difficult and time-consuming process that can further delay the completion of the product or service associated with the code. Furthermore, the process relies on the sensitive terms being identified within a large number of lines of code, which can be difficult even with an exceptional quality control process.

SUMMARY

It is to be understood that both the following general description and the following detailed description are exemplary and explanatory only and are not restrictive. Methods and systems for communications management are described.

Methods, systems, and apparatuses are provided for predicting if an item of text data includes one or more sensitive terms. An item of text data may be received by a computing device. The item of text data may be received from a second computing device associated with a user. The computing device may determine one or more words within the item of text data. An arrangement of the one or more words may be determined. The arrangement of the one or more words may be based on an assignment bearing vectorization of the item of text data and/or a position bearing vectorization of the item of text data. Based on the arrangement of the one or more words within the item of text data, the computing device may determine a potential sensitive term within the item of text data. The computing device may cause an output of an indication of the potential sensitive term. The user may determine if the potential sensitive term is an actual sensitive term. Based on the potential sensitive term being a sensitive term, the computing device may receive an indication of a modification to the item of text data. The indication may include the removal or modification of the sensitive term.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
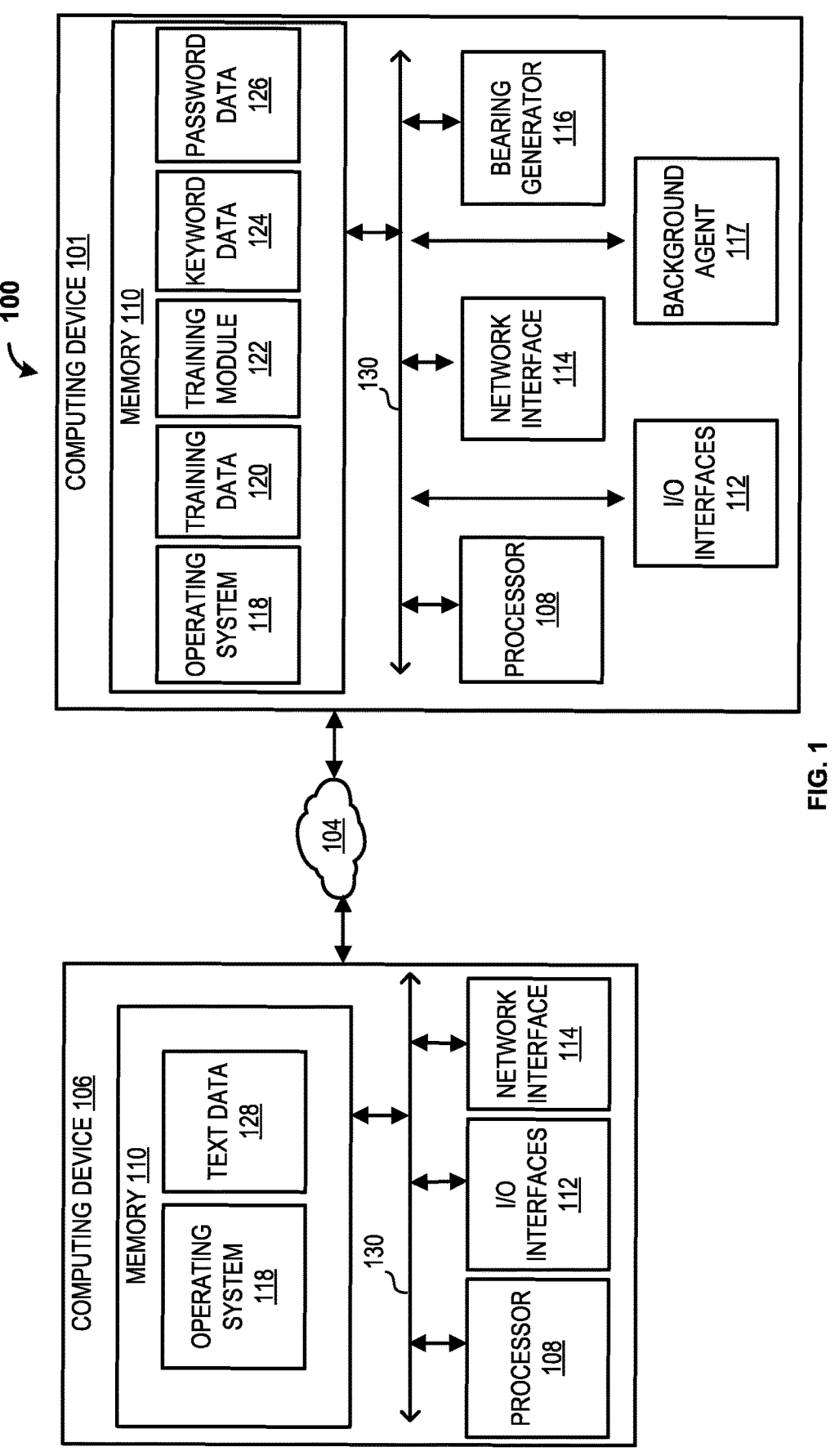
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

FIG. 1 shows an example system 100 for detecting sensitive terms in text data. The system 100 may comprise non-limiting examples of a computing device 101 and a computing device 106 connected through a network 104. FIG. 1 shows the computing device 101 as comprising a plurality of modules and components and the computing device 106 as comprising a few modules and components, for explanatory purposes only. It is to be understood that all of the computing devices 101, 102, 106 shown in the system 100 may comprise additional components/modules, other than those that are shown in FIG. 1. In an aspect, some or all steps of any described method herein may be performed on any of the computing devices as described herein. The computing device 101 can comprise one or multiple computers configured to store one or more of the training module 120, training data 122, keyword data 124, password data 126, and the like. The computing device 106 can comprise one or multiple computers configured to store receive inputs of data 128 (e.g., text data from a user).

The computing devices 101, 106 may communicate via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 104 via a variety of transmission paths, including wireless paths (e.g., satellite paths, Wi-Fi paths, cellular paths, etc.) and terrestrial paths (e.g., wired paths, a direct feed source via a direct line, etc.).

The computing device 101 and the computing device 106 may each be a digital computer that, in terms of hardware architecture, generally includes one or more processors 108, memory system 110, input/output (I/O) interfaces 112, and network interfaces 114. The one or more processors 108, memory system 110, input/output (I/O) interfaces 112, and network interfaces 114 may be communicatively coupled via a local interface 130. The local interface 130 may be, for example, but not limited to, one or more buses or other wired or wireless connections, as is known in the art. The local interface 130 may have additional elements, which are omitted for simplicity, such as controllers, buffers (caches), drivers, repeaters, and receivers, to enable communications. Further, the local interface 130 may include address, control, and/or data connections to enable appropriate communications among the aforementioned components.

The one or more processors 108 can be hardware device (s) for executing software, particularly that stored in memory system 110. The one or more processors 108 can be any custom made or commercially available processor, a central processing unit (CPU), an auxiliary processor among several processors associated with the computing device 101 and the computing device 106, a semiconductor-based microprocessor (in the form of a microchip or chip set), or generally any device for executing software instructions. When the computing device 101 and/or the computing device 106 is in operation, the one or more processors 108 can be configured to execute software stored within the memory system 110, to communicate data to and from the memory system 110, and to generally control operations of the computing device 101 and the computing device 106 pursuant to the software.

The I/O interfaces 112 can be used to receive user input from, and/or for providing system output to, one or more devices or components. User input can be provided via, for example, a keyboard, a microphone, and/or a mouse. System output can be provided via a display device and a printer (not shown). I/O interfaces 112 can include, for example, a serial port, a parallel port, a Small Computer System Interface (SCSI), an infrared (IR) interface, a radio frequency (RF) interface, and/or a universal serial bus (USB) interface.

The network interface 114 can be used to transmit and receive from the computing device 101 and/or the computing device 106 on the network 104. The network interface 114 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi, cellular, satellite), or any other suitable network interface device. The network interface 114 may include address, control, and/or data connections to enable appropriate communications on the network 104.

The computing device 101 may comprise a bearing generator 116. The bearing generator 116 may be configured to convert data associated with each item of text data into a vector representation of that item of text data. For example, the bearing generator 116 may be configured to determine and/or generate one or more of a position bearing vectorization, an assignment bearing vectorization, a keyword bearing vectorization, a threshold bearing vectorization, or a password bearing vectorization. For example, the bearing generator 116 may be configured to determine or generate the vectors based on an analysis of the item of text data.

The memory system 110 can include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the memory system 110 may incorporate electronic, magnetic, optical, and/or other types of storage media. Note that the memory system 110 can have a distributed architecture, where various components are situated remote from one another, but can be accessed by the one or more processors 108.

The software in memory system 110 may include one or more software programs, each of which comprises an ordered listing of executable instructions for implementing logical functions. In the example of FIG. 1, the software in the memory system 110 of the computing device 101 can comprise the training module 122 (or subcomponents thereof), the training data 120, keyword data 124, password data 126, and a suitable operating system (O/S) 118. In the example of FIG. 1, the software in the memory system 110 of the computing device 106 can comprise, a suitable operating system (O/S) 118. The operating system 118 essentially controls the execution of other computer programs and provides scheduling, input-output control, file and data management, memory management, and communication control and related services.

The training data 120 may comprise a plurality of historical items of text data. The historical items of text data may be a line or single entry of text data. For example, the historical item of text data may comprise one or more of a line of computer code, a database entry, or a database query. The plurality of historical items of text data may be used to train a machine learning model configured to predict if an item of text data includes a sensitive term (e.g., a potential sensitive term). For example, the plurality of historical items of text data may be associated with (e.g., created by) a single user or multiple users. At least a portion of the plurality of historical items of text data may comprise one or more sensitive terms. The plurality of historical items of text data may also comprise word elements and non-word elements (e.g., numbers, symbols, characters, commands, etc.).

The keyword data 124 may comprise words, symbols, and commands generally used for one or more programming languages or syntaxes. For example, the words, symbols, and commands of one programming language or syntax may be different from the words, symbols, and commands for a different programming language or syntax. As such, the keyword data 124 may be organized based on the particular programming languages and/or syntaxes for which keyword data is stored.

The password data 126 may comprise a plurality of common passwords. For example, the password data 126 may comprise a listing of one or more actual passwords for an organization.

For purposes of illustration, application programs and other executable program components such as the operating system 118 and the training module 122 are illustrated herein as discrete blocks, although it is recognized that such programs and components can reside at various times in different storage components of the computing device 101 and/or the computing device 106.

The training module 122 may be a machine-learning module 122. The training module 122 may be configured to evaluate the training data 120 and generate one or more trained models. The one or more trained models may be configured to detect sensitive terms within items of text data. An implementation of the training module 122 can be stored on or transmitted across some form of computer-readable media.

Any of the disclosed methods can be performed by computer-readable instructions embodied on computer-readable media (e.g., non-transitory computer-readable media). Computer-readable media can be any available media that can be accessed by a computer. By way of example and not meant to be limiting, computer-readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 2:
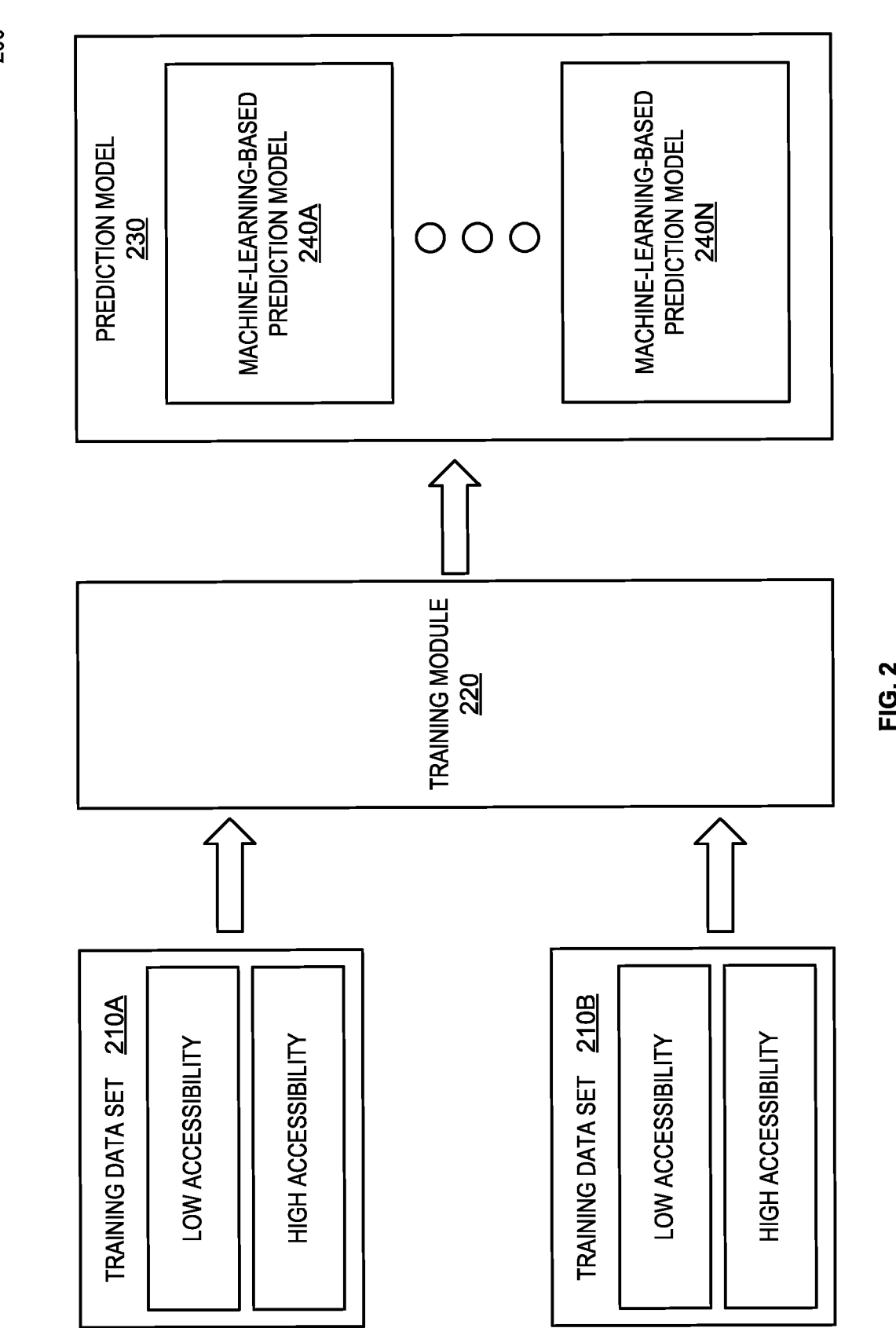
FIG. 2 shows an example system.

Machine learning and other artificial intelligence techniques may be used to train a prediction model (e.g., the trained model). The prediction model, once trained, may be configured to determine the probability that an item of text data includes one or more sensitive terms (e.g., secrets, confidential information, a password). For example, any one or more of the computing device 101 or the computing device 106 of the system 100 may use the trained prediction model to determine if potential sensitive terms are within the items of text data (e.g., a received line of text data). The prediction model (referred to herein as the at least one prediction model 230, or simply the prediction model 230) may be trained by a system 200 as shown in FIG. 2.

The system 200 may be configured to use machine-learning techniques to train, based on an analysis of one or more training datasets 210A-210B by a training module 220, the at least one prediction model 230. The at least one prediction model 230, once trained, may be configured to predict if text data includes a sensitive term or potential sensitive term. A dataset indicative of a plurality of text data that may or may not include sensitive terms may be used by the training module 220 to train the at least one prediction model 230. For example, the plurality of text data may be a plurality of lines of computer code. For example, the plurality of text data may be a plurality of database entries or queries. For example, the plurality of text data may be user specific (e.g., the user who created the plurality of text data) or user agnostic. Each of the plurality of text data in the dataset may be associated with one or more multimodal features of a plurality of multimodal features that are associated with the sensitive terms. The plurality of multimodal features and the sensitive terms for each of the plurality of text data may be used to train the at least one prediction model 230.

The training dataset 210A may comprise a first portion of the plurality of text data in the dataset (e.g., the training data 120 of FIG. 1). Each item of text data in the first portion may have a labeled (e.g., predetermined) sensitive term (e.g., a secret, confidential information, a password) and one or more labeled multimodal features associated with the item of text data. The training dataset 210B may comprise a second portion of the text data in the dataset. Each item of text data in the second portion may have a labeled (e.g., predetermined) sensitive term (e.g., a secret, confidential information, a password) and one or more labeled multimodal features associated with the item or text data. The plurality of text data may be randomly assigned to the training dataset 210A, the training dataset 210B, and/or to a testing dataset. In some implementations, the assignment of items of text data to a training dataset or a testing dataset may not be completely random. In this case, one or more criteria may be used during the assignment, such as ensuring that similar numbers of items of text data with different sensitive terms and/or multimodal features are in each of the training and testing datasets. In general, any suitable method may be used to assign the items of text data to the training or testing datasets, while ensuring that the distributions of sensitive terms, locations of sensitive terms within the text data, and/or multimodal features are somewhat similar in the training dataset and the testing dataset.

The training module 220 may use the first portion and the second portion of the plurality of items of text data to determine one or more multimodal features that are indicative of an accurate (e.g., a high confidence level for the) sensitive term (e.g., one or more confidential words, one or more secret words, or a password). That is, the training module 220 may determine which multimodal features associated with the plurality of items of text data are correlative with an accurate sensitive term. The one or more multimodal features indicative of an accurate sensitive term may be used by the training module 220 to train the prediction model 230. For example, the training module 220 may train the prediction model 230 by extracting a feature set (e.g., one or more multimodal features) from the first portion in the training dataset 210A according to one or more feature selection techniques. The training module 220 may further define the feature set obtained from the training dataset 210A by applying one or more feature selection techniques to the second portion in the training dataset 210B that includes statistically significant features of positive examples (e.g., accurate sensitive terms) and statistically significant features of negative examples (e.g., inaccurate sensitive terms). The training module 220 may train the prediction model 230 by extracting a feature set from the training dataset 210B that includes statistically significant features of positive examples (e.g., accurate sensitive terms) and statistically significant features of negative examples (e.g., inaccurate sensitive terms).

The training module 220 may extract a feature set from the training dataset 210A and/or the training dataset 210B in a variety of ways. For example, the training module 220 may extract a feature set from the training dataset 210A and/or the training dataset 210B using a multimodal detector. The training module 220 may perform feature extraction multiple times, each time using a different feature-extraction technique. In one example, the feature sets generated using the different techniques may each be used to generate different machine-learning-based prediction models 240. For example, the feature set with the highest quality metrics may be selected for use in training. The training module 220 may use the feature set(s) to build one or more machine-learning-based prediction models 240A-240N that are configured to identify a sensitive term within the particular item of text data.

The training dataset 210A and/or the training dataset 210B may be analyzed to determine any dependencies, associations, and/or correlations between multimodal features and the sensitive terms in the items of text data in the training dataset 210A and/or the training dataset 210B. The identified correlations may have the form of a list of multimodal features that are associated with different sensitive terms. The multimodal features may be considered as features (or variables) in the machine-learning context. The term "feature," as used herein, may refer to any characteristic of an item of data that may be used to determine whether the item of data falls within one or more specific categories or within a range. By way of example, the features described herein may comprise one or more multimodal features.

A feature selection technique may comprise one or more feature selection rules. The one or more feature selection rules may comprise a multimodal feature occurrence rule. The multimodal feature occurrence rule may comprise determining which multimodal features in the training dataset

210A occur over a threshold number of times and identifying those multimodal features that satisfy the threshold as candidate features. For example, any multimodal features that appear greater than or equal to 5 times in the training dataset 210A may be considered as candidate features. Any multimodal features appearing less than 5 times may be excluded from consideration as a feature in the training dataset 210A. Other threshold numbers may be used as well.

A single feature selection rule may be applied to select features or multiple feature selection rules may be applied to select features. The feature selection rules may be applied in a cascading fashion, with the feature selection rules being applied in a specific order and applied to the results of the previous rule. For example, the multimodal feature occurrence rule may be applied to the training dataset 210A to generate a first list of multimodal features. A final list of candidate multimodal features may be analyzed according to additional feature selection techniques to determine one or more candidate multimodal feature groups (e.g., groups of multimodal features that may be used to predict a sensitive term within an item of text data). Any suitable computational technique may be used to identify the candidate multimodal feature groups using any feature selection technique such as filter, wrapper, and/or embedded methods. One or more candidate multimodal feature groups may be selected according to a filter method. Filter methods include, for example, Pearson's correlation, linear discriminant analysis, analysis of variance (ANOVA), chi-square, combinations thereof, and the like. The selection of features according to filter methods are independent of any machine-learning algorithms used by the system 200. Instead, features may be selected on the basis of scores in various statistical tests for their correlation with the outcome variable (e.g., a predicted time window).

As another example, one or more candidate multimodal feature groups may be selected according to a wrapper method. A wrapper method may be configured to use a subset of features and train the prediction model 230 using the subset of features. Based on the inferences that drawn from a previous model, features may be added and/or deleted from the subset. Wrapper methods include, for example, forward feature selection, backward feature elimination, recursive feature elimination, combinations thereof, and the like. For example, forward feature selection may be used to identify one or more candidate multimodal feature groups. Forward feature selection is an iterative method that begins with no features. In each iteration, the feature which best improves the model is added until an addition of a new variable does not improve the performance of the model. As another example, backward elimination may be used to identify one or more candidate multimodal feature groups. Backward elimination is an iterative method that begins with all features in the model. In each iteration, the least significant feature is removed until no improvement is observed on removal of features. Recursive feature elimination may be used to identify one or more candidate multimodal feature groups. Recursive feature elimination is a greedy optimization algorithm which aims to find the best performing feature subset. Recursive feature elimination repeatedly creates models and keeps aside the best or the worst performing feature at each iteration. Recursive feature elimination constructs the next model with the features remaining until all the features are exhausted. Recursive feature elimination then ranks the features based on the order of their elimination.

As a further example, one or more candidate multimodal feature groups may be selected according to an embedded method. Embedded methods combine the qualities of filter and wrapper methods. Embedded methods include, for example, Least Absolute Shrinkage and Selection Operator (LASSO) and ridge regression which implement penalization functions to reduce overfitting. For example, LASSO regression performs L1 regularization which adds a penalty equivalent to absolute value of the magnitude of coefficients and ridge regression performs L2 regularization which adds a penalty equivalent to square of the magnitude of coefficients.

After the training module 220 has generated a feature set(s), the training module 220 may generate the one or more machine-learning-based prediction models 240A-240N based on the feature set(s). A machine-learning-based prediction model (e.g., any of the one or more machine-learning-based prediction models 240A-240N) may refer to a complex mathematical model for data classification that is generated using machine-learning techniques as described herein. In one example, a machine-learning-based prediction model may include a map of support vectors that represent boundary features. By way of example, boundary features may be selected from, and/or represent the highest-ranked features in, a feature set.

The training module 220 may use the feature sets extracted from the training dataset 210A and/or the training dataset 210B to build the one or more machine-learning-based prediction models 240A-240N for each classification category (e.g., viewing window ranges). In some examples, the one or more machine-learning-based prediction models 240A-240N may be combined into a single machine-learning-based prediction model 240 (e.g., an ensemble model). Similarly, the prediction model 230 may represent a single classifier containing a single or a plurality of machine-learning-based prediction models 240 and/or multiple classifiers containing a single or a plurality of machine-learning-based prediction models 240 (e.g., an ensemble classifier).

The extracted features (e.g., one or more candidate multimodal features) may be combined in the one or more machine-learning-based prediction models 240A-240N that are trained using a machine-learning approach such as discriminant analysis; decision tree; a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic regression algorithms; linear regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like. The resulting prediction model 230 may comprise a decision rule or a mapping for each candidate multimodal feature in order to assign a predicted time window to a class (e.g., viewing window ranges). As described further herein, the resulting prediction model 230 may be used to provide a prediction of sensitive terms within items of the text data. The candidate multimodal features and the prediction model 230 may be used to predict sensitive terms in the items of the text data in the testing dataset (e.g., a third portion of the plurality of items of text data).

Figure 3:
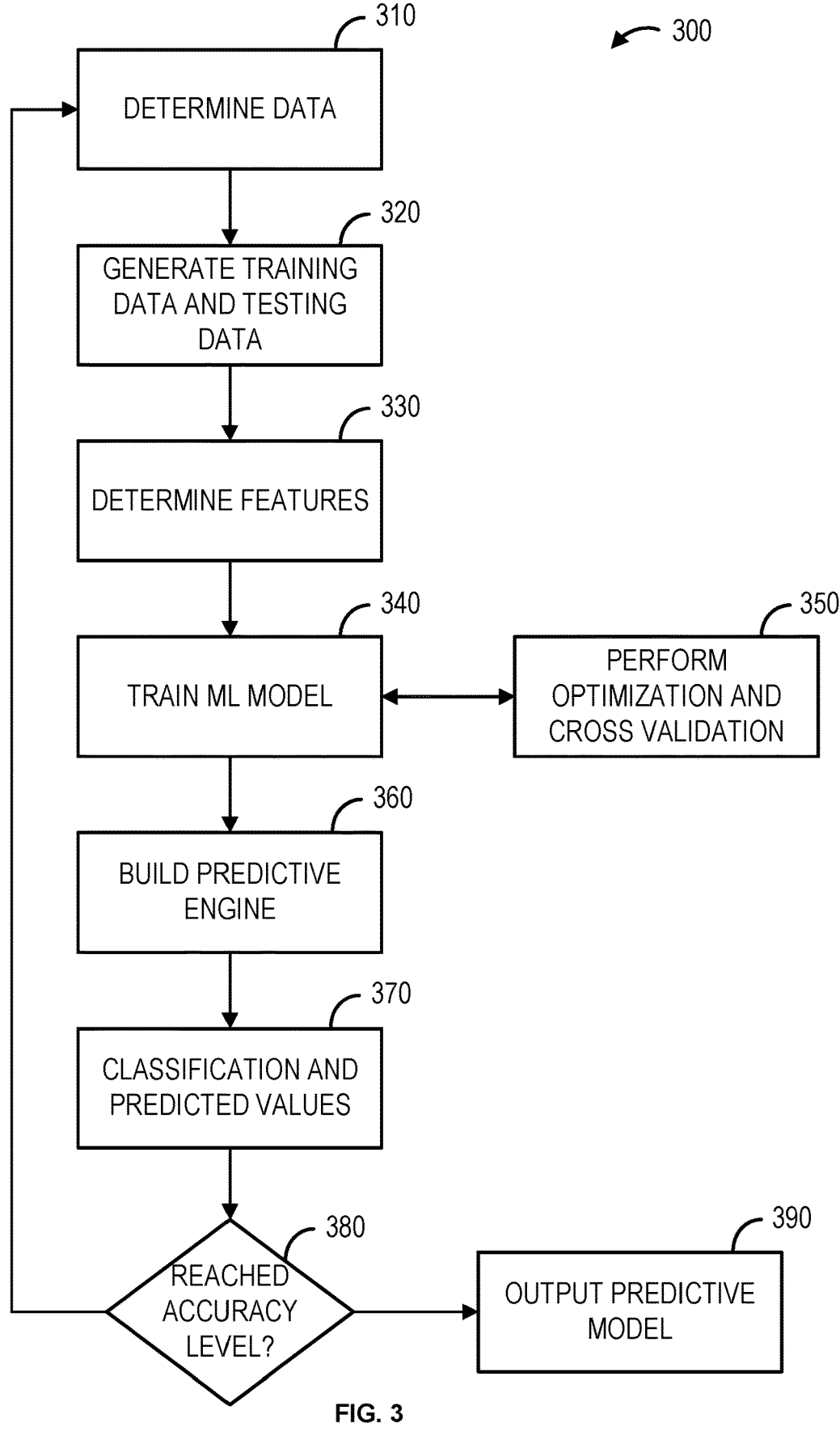
FIG. 3 shows a flowchart for an example method.

FIG. 3 is a flowchart illustrating an example training method 300 for generating the prediction model 230 using the training module 220. The training module 220 can implement supervised, unsupervised, and/or semi-supervised (e.g., reinforcement based) machine learning-based prediction models 240A-240N. The method 300 illustrated in FIG. 3 is an example of a supervised learning method; variations of this example of training method are discussed below, however, other training methods can be analogously implemented to train unsupervised and/or semi-supervised machine-learning models. The method 300 may be implemented by any one or more of the computing device 101 and the computing device 106.

At 310, the training method 300 may determine (e.g., access, receive, retrieve, etc.) first items of text data (e.g., the first portion of the plurality of items of text data described above) and second items of text data (e.g., the second portion of the plurality of items of text data described above). The first items of text data and the second items of text data may each comprise one or more multimodal features and a sensitive term (e.g., one or more secret words, one or more confidential words, one or more passwords). The training method 300 may generate, at 320, a training dataset and a testing dataset. The training dataset and the testing dataset may be generated by randomly assigning items of text data from the first items of text data and/or the second items of text data to either the training dataset or the testing dataset. In some implementations, the assignment of items of text data as training or test samples may not be completely random. As an example, only the items of text data for a specific multimodal feature(s) and/or particular sensitive terms or particular types of sensitive terms (e.g., secret, confidential, password) may be used to generate the training dataset and the testing dataset. As another example, a majority of the items of text data for the specific multimodal feature(s) and/or sensitive terms or types of sensitive terms may be used to generate the training dataset. For example, 75% of the items of text data for the specific multimodal feature(s) and/or sensitive terms or types of sensitive terms may be used to generate the training dataset and 25% may be used to generate the testing dataset.

The training method 300 may determine (e.g., extract, select, etc.), at 330, one or more features that can be used by, for example, a classifier to differentiate among different classifications (e.g., sensitive terms or types of sensitive terms). The one or more features may comprise a set of multimodal features. As an example, the training method 300 may determine a set of features from the first items of text data. As another example, the training method 300 may determine a set of features from the second items of text data. In a further example, a set of features may be determined from other items of text data of the plurality of items of text data (e.g., a third portion) associated with a specific multimodal feature(s) and/or sensitive terms or types of sensitive terms that may be different than the specific multimodal feature(s) and/or sensitive terms or types of sensitive terms included in the items of text data of the training dataset and the testing dataset. In other words, the other items of text data (e.g., the third portion) may be used for feature determination/selection, rather than for training. The training dataset may be used in conjunction with the other items of text data to determine the one or more features. The other items of text data may be used to determine an initial set of features, which may be further reduced using the training dataset.

The training method 300 may train one or more machine-learning models (e.g., one or more prediction models) using the one or more features at 340. In one example, the machine-learning models may be trained using supervised learning. In another example, other machine-learning techniques may be employed, including unsupervised learning and semi-supervised. The machine-learning models trained at 340 may be selected based on different criteria depending on the problem to be solved and/or data available in the training dataset. For example, machine-learning models can suffer from different degrees of bias. Accordingly, more than one machine-learning model can be trained at 340, and then optimized, improved, and cross-validated at 350.

The training method 300 may select one or more machine-learning models to build the prediction model 230 at 360. The prediction model 230 may be evaluated using the testing dataset. The prediction model 230 may analyze the testing dataset and generate classification values and/or predicted values (e.g., potential sensitive terms) at 370. Classification and/or prediction values may be evaluated at 380 to determine whether such values have achieved a desired accuracy level (e.g., a confidence level for the potential sensitive terms). Performance of the prediction model 230 may be evaluated in a number of ways based on a number of true positives, false positives, true negatives, and/or false negatives classifications of the plurality of data points indicated by the prediction model 230.

For example, the false positives of the prediction model 230 may refer to a number of times the prediction model 230 incorrectly identified a potential sensitive term in an item of text data associated with a low confidence level. Conversely, the false negatives of the prediction model 230 may refer to a number of times the machine-learning model failed to identify a potential sensitive term in an item of text data associated with a high confidence level. True positives may refer to a number of times the prediction model 230 correctly identified a sensitive term as a potential sensitive term for each item of text data. True negatives may refer to a number of times the prediction model 230 correctly determines that an item of text data does not include a sensitive term (e.g., does not indicate a potential sensitive term which is not a sensitive term). Related to these measurements are the concepts of recall and precision. Generally, recall refers to a ratio of true positives to a sum of true positives and false negatives, which quantifies a sensitivity of the prediction model 230. Similarly, precision refers to a ratio of true positives a sum of true and false positives. When such a desired accuracy level (e.g., confidence level) is reached, the training phase ends and the prediction model 230 may be output at 390; when the desired accuracy level is not reached, however, then a subsequent iteration of the training method 300 may be performed starting at 310 with variations such as, for example, considering a larger collection of items of text data.

The prediction model 230 may be output at 390. The prediction model 230 may be configured to indicate potential sensitive terms in the items of text data that may or may not be within the plurality of items of text data used to train the prediction model. For example, the prediction model 230 may be trained and output by a first computing device. The first computing device may provide the prediction model 230 to a second computing device. As described herein, the method 300 may be implemented by any one or more of the computing devices 101 or the computing device 106. The first computing device may be any one of computing devices 101 or the computing device 106. The second computing device may be any one of the computing devices 101 or the computing device 106.

Figures 4, 5, 6, 7:
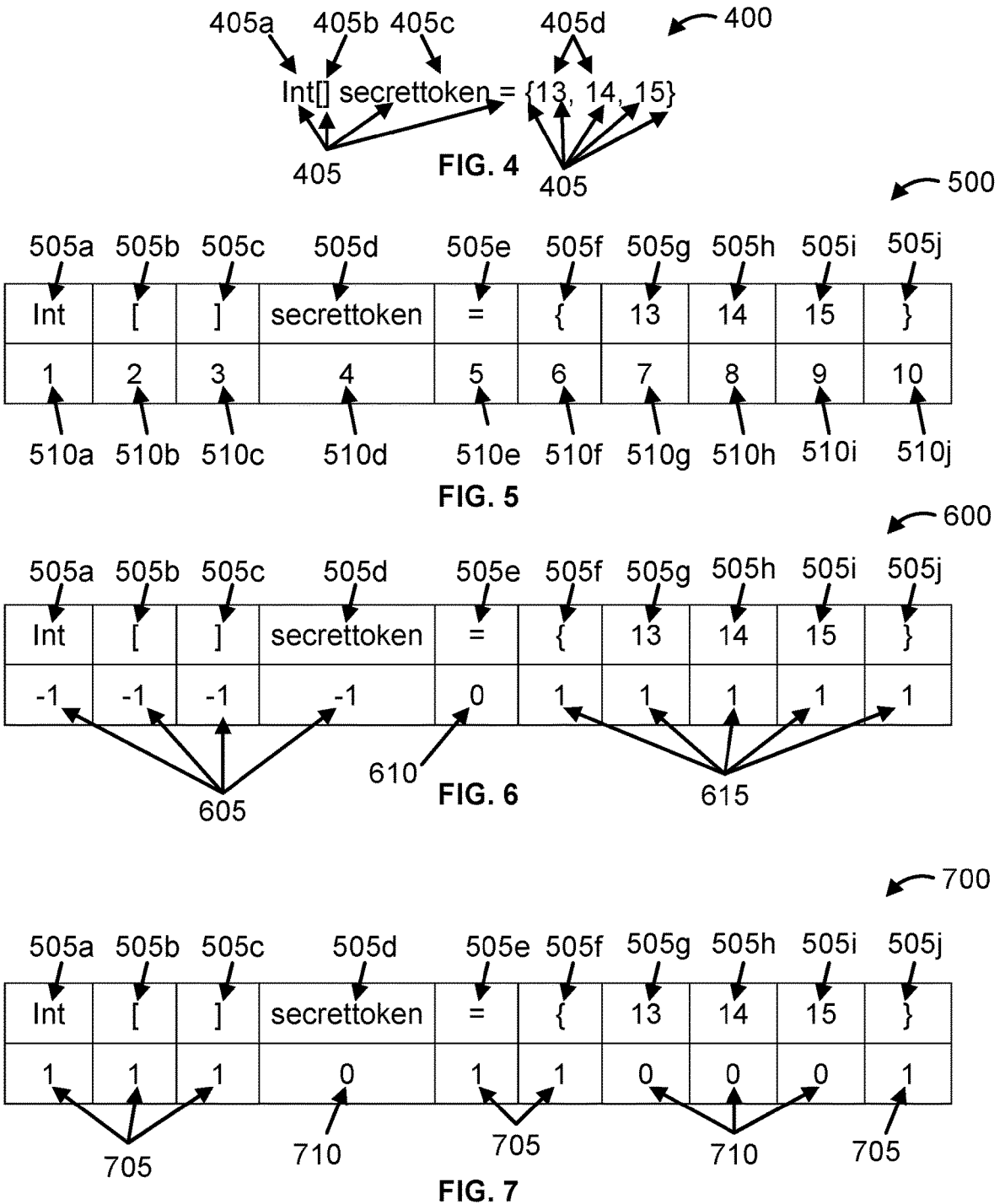
FIG. 4 shows an example text data input.
FIG. 5 shows a block diagram for example position bearing for the text data input.
FIG. 6 shows a block diagram for example assignment bearing for the text data input.
FIG. 7 shows a block diagram for example keyword bearing for the text data input.

FIG. 4 shows an example item of text data 400. The item of text data 400 may be input by a user at the computing device 106. The computing device 106 may send the item of text data 400 to the computing device 101 via the network 104 or another network. The computing device 101 may receive the item of text data 400. The item of text data 400 may be for training data set 210A, 210B, for the testing data set, or for evaluation by the trained model 230. For example, the item of text data 400 may comprise a single line of text data or a single entry of text data (e.g., as indicated by the user depressing the "enter" key, any other carriage return character, or any other form of completing the entry of an item of data). For example, the item of text data 400 may be a line of computer code, a database entry, or a database query. For example, the line of computer code may be for any computer programming language.

The item of text data 400 may comprise a plurality of elements 405. The plurality of elements 405 may comprise any alphanumeric characters or symbols. For example, the elements 405 may comprise word elements 405c and non-word elements 405a, 405b, 405d. For example, the word elements 405c may be a single word, a plurality of words, or a combination of words or phrases. For example, the word elements may comprise real or fictitious (e.g., made up) words. For example, the non-word elements may comprise commands 405a, symbols 405b, numerals 405d and any other items or characters that are not characterized as word elements. The item of text data 400 may have any format, structure, and/or organization. To evaluate the item of text data 400 using machine learning, all or a portion of the item of text data may be modified to create a vectorized representation of the item of text data 400. Vectorizing the item of text data 400 can take any form known to those of ordinary skill in the art. For example, the item of text data 400 may be vectorized to generate one or more of a position bearing vectorization of the item of text data 400, an assignment or arrangement bearing vectorization of the item of text data 400, a keyword bearing vectorization of the item of text data 400, or a threshold bearing vectorization of the item of text data 400, as will be described in greater detail below. While the example item of text data 400 of FIG. 4 is a line of computer code, this is for example purposes only and not intended to be limiting in any manner as other items of text data may be similarly evaluated to develop a trained model and to evaluate subsequently item of text data with the trained model to identify potential sensitive terms.

FIG. 5 shows a block diagram for example position bearing vectorization 500 for the item of text data 400. The position bearing vectorization 500 for the item of text data 400 may be generated by the computing device 101, such as by the bearing generator 116. For example, position bearing vectorization on the item of text data 400 may facilitate an evaluation of the probability of a sensitive term in different positions within the item of text data 400. For example, based on analysis of the training data 120, the computing device 101 may determine that a low probability exists that the sensitive term is at the beginning or within the first few positions of the elements of the item of text data 400. For example, the position of each element may be determined starting on the left side of the item of text data. However, in other examples, the position of each element may be determined starting on the right side of the item of text data 400.

For example, the bearing generator 116 may separate each element 505a-505j of the item of text data 400. When separating each element 505a-505j, the bearing generator 116 may not separate a word into discrete letters or a number into discrete numerals. Furthermore, the bearing generator 116 may not separate commands into discrete letters. For each element 505a-505j of the item of text data 400, a position number 510a-510j may be assigned. For example, the first element 505a "Int" in the item of text data 400 may be assigned the vector position variable 1 510a to represent it as being the element 505a in the first position in the item of text data 400. For example, the second element 505*b* "[" in the item of text data 400 may be assigned the vector position variable 2 510*b* to represent it as being the element 505*b* in the second position in the item of text data 400. For example, the third element 505*b* "]" in the item of text data 400 may be assigned the vector position variable 3 510*c* to represent it as being the element 505*c* in the third position in the item of text data 400. For example, the fourth element 505*d* "secrettoken," which may be the sensitive term, in the item of text data 400 may be assigned the vector position variable 4 510*d* to represent it as being the element 505*d* in the fourth position in the item of text data 400. For example, the fifth element 505*e* "=" in the item of text data 400 may be assigned the vector position variable 5 510*e* to represent it as being the element 505*e* in the fifth position in the item of text data 400. For example, the sixth element 505*f* "{" in the item of text data 400 may be assigned the vector position variable 6 510*f* to represent it as being the element 505*f* in the sixth position in the item of text data 400. For example, the sixth element 505*g* "13" in the item of text data 400 may be assigned the vector position variable 7 510*g* to represent it as being the element 505*g* in the seventh position in the item of text data 400. For example, the seventh element 505*h* "14" in the item of text data 400 may be assigned the vector position variable 8 510*h* to represent it as being the element 505*h* in the eighth position in the item of text data 400. For example, the ninth element 505*i* "15" in the item of text data 400 may be assigned the vector position variable 9 510*i* to represent it as being the element 505*i* in the ninth position in the item of text data 400. For example, the tenth element 505*j* "}" in the item of text data 400 may be assigned the vector position variable 10 510*j* to represent it as being the element 505*j* in the tenth position in the item of text data 400.

FIG. 6 shows a block diagram for example assignment or arrangement bearing vectorization 600 for the item of text data 400. The assignment bearing vectorization 600 for the item of text data 400 may be generated by the computing device 101, such as by the bearing generator 116. For example, assignment bearing vectorization on the item of text data 400 may facilitate an evaluation of the arrangement of elements 505*a*-505*j* within the item of text data 400. For example, how the elements 505*a*-505*j*, especially word elements such as the sensitive term 505*d*, are arranged within the item of text data, such as with regard to an assignment element 505*e* within the item of text data 400, may indicate the probability, based on arrangement, of the sensitive term within the item of text data 400. For example, generating an assignment bearing allows the training module and the trained models to determine information regarding the position or arrangement of elements 505*a*-505*d* and 505*f*-505*j* before and after the assignment element 505*e*. For example, based on analysis of the training data 120, the computing device 101 may determine that a low probability exists that the sensitive term is positioned on the left hand side of the assignment element 505*e* within the item of text data 400. For example, the assignment element 505*e* may be an "=," a ":," or any other element for assigning the value of its right-hand operand positioned to the right of the assignment element to a variable, a property, or an indexer element given by its left-hand operand positioned to the left of the assignment element. For example, the assignment element 505*e* may be any other symbol or keyword according to the context of the corpus of the plurality of items of text data 400.

For example, the assignment element 505*e* may be assigned a first value 610. For example, the first value may be zero, however in other examples, a different numerical value may be used. For example, the elements 505*a*-*d* to the left (e.g., on the left side) of the assignment element 505*e* within the item of text data 400 may each be assigned a second value 605. For example, the second value may be (−1), however in other examples, a different numerical value may be used. For example, the elements 505*f*-*j* to the right (e.g., on the right side) of the assignment element 505*e* within the time of text data 400 may each be assigned a third value 615. For example, the third value may be (1), however in other examples, a different numerical value may be used. For example, the training module 122, 220 and the trained model 230, when evaluating the item of text data 400, may determine, based on the assignment bearing vectorization for the item of text data 400, that the element "13" 505*g* is arranged to the right of the assignment element 505*e* based on the assignment value (1) and that the element "secrettoken" 505*d* is arranged to the left of the assignment element 505*e* based on the assignment value (−1).

FIG. 7 shows a block diagram for example keyword bearing vectorization 700 for the item of text data 400. The keyword bearing vectorization 700 for the item of text data 400 may be generated by the computing device 101, such as by the bearing generator 116. For example, keyword bearing vectorization on the item of text data 400 may facilitate an evaluation of the keywords or characters that are elements 505*a*-505*j* within the item of text data 400. For example, the keywords or characters (e.g., collectively key elements) may be specific to the programming language or syntax being used in the item of text data 400. For example, key elements for each programming language or syntax may be stored within the keyword data 124. For example, key elements of one programming language or syntax may be different from key elements for a different programming language or syntax. For example, the key elements may be any other groups of symbols or words according to the context of the corpus of the plurality of items of text data 400.

For example, the bearing generator 116 may compare each element of the item of text data 400 to the key elements (e.g., within the keyword data 124) for the particular programming language or syntax to determine if a match exists. Based on the match, the bearing generator may determine that the particular element is a key element within the item of text data 400. For example, elements 505*a*-505*j* within the item of text data 400 that are key elements for the particular programming language or syntax would have a very low probability of being a sensitive term. For example, generating an keyword bearing allows the training module and the trained model 230 to determine which elements are related to the programming language or syntax and which elements may not be specific to the programming language or syntax and therefore potentially a sensitive term.

For example, based on a comparison to the keyword data 124, the bearing generator 116 may determine that the elements 505*a*-*c*, 505*e*-*f*, and 505*j* are or match key elements. The bearing generator 116 may assign the elements 505*a*-*c*, 505*e*-*f*, and 505*j* a first value 705. For example, the first value may be (1), however in other examples, a different numerical value may be used. For example, based on a comparison to the keyword data 124, the bearing generator 116 may determine that the elements 505*d* and 505*g*-*i* are not or do not match key elements. The bearing generator 116 may assign the elements 505*d* and 505*g*-*i* a second value 710. For example, the second value may be zero (0), however in other examples, a different numerical value may be used. For example, the training module 122, 220 and the trained model 230, when evaluating the item of text data

400, may determine, based on the keyword bearing vectorization for the item of text data 400, that the element "Int" 505a is a key element based on the keyword value (1) and that the element "secrettoken" 505d is not a key element based on the keyword value (0).

Figure 8:
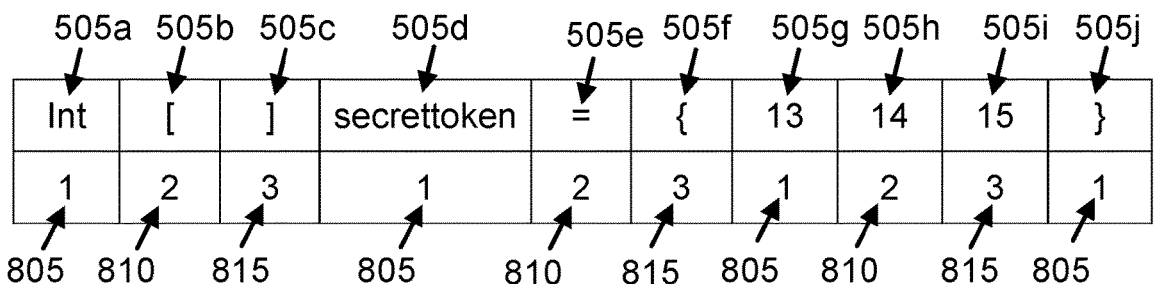
FIG. 8 shows a block diagram for example threshold bearing for the text data input.

FIG. 8 shows a block diagram for example threshold bearing vectorization 800 for the item of text data 400. The threshold bearing vectorization 800 for the item of text data 400 may be generated by the computing device 101, such as by the bearing generator 116. For example, threshold bearing vectorization on the item of text data 400 may facilitate an evaluation of the programming of syntax construct in the item of text data 400. For example, certain constructs of programming languages may indicate higher or lower probabilities for the location of sensitive terms within the item of text data 400. For example, an n-gram (non-sliding window) threshold may be selected for embedding values associated with the elements 505a-j of the item of text data 400. For example, the value (n) can be adjusted or fine-tuned, up or down, across multiple iterations of evaluating the trained models 230 to determine which value (n) is most effective in helping predict sensitive terms within the plurality of items of text data. In the example of FIG. 8, the value (n) is set to three, but this is solely for presenting the example herein. In other examples, the value (n) can be any number greater than zero.

For example, based on the value (n) being equal to three, the first element 505a (e.g., starting from the left hand side) in the item of text data 400 may be assigned the value 1 805. For example, the second element 505b in the item of text data 400 may be assigned the value 2 810. For example, the third element 505c in the item of text data 400 may be assigned the value 3 815. As the value has reached the set value (n), the assigned value may be reset to 1 and may begin again. For example, the fourth element 505d in the item of text data 400 may be assigned the value 1 805. For example, the fifth element 505e in the item of text data 400 may be assigned the value 2 810. For example, the sixth element 505f in the item of text data 400 may be assigned the value 3 815. As the value has reached the set value (n), the assigned value may be reset to 1 and may begin again. For example, the seventh element 505g in the item of text data 400 may be assigned the value 1 805. For example, the eighth element 505h in the item of text data 400 may be assigned the value 2 810. For example, the ninth element 505i in the item of text data 400 may be assigned the value 3 815. As the value has reached the set value (n), the assigned value may be reset to 1 and may begin again. For example, the tenth element 505j in the item of text data 400 may be assigned the value 1 805.

For example, a password bearing vectorization may be generated for the item of text data 400. The password bearing vectorization for the item of text data 400 may be generated by the computing device 101, such as by the bearing generator 116. For example, password bearing vectorization on the item of text data 400 may facilitate an evaluation of whether common passwords are elements 505a-505j within the item of text data 400. For example, the common passwords may be stored within the password data 126.

For example, the bearing generator 116 may compare each element of the item of text data 400 to the known or common passwords (e.g., within the password data 126) to determine if a match exists or substantially exists. For example, a match may substantially exist if the element 505a-505j is a plural or singular form of a password such that when the password is the plural form of a word, the element being the singular form of the same word would be considered to be a match. Based on the match, the bearing generator may determine that the particular element is a password within the item of text data 400. For example, elements 505a-505j within the item of text data 400 that are a match to passwords would be a sensitive term or have a very high probability of being a sensitive term.

For example, based on a comparison to the password data 126, elements the bearing generator 116 determines are or match a password in the password data 126 may be assigned a first value. For example, the first value may be (1), however in other examples, a different numerical value may be used. For example, based on a comparison to the password data 126, elements the bearing generator 116 determines are not or do not match a password in the password data 126 may be assigned a second value. For example, the second value may be (0), however in other examples, a different numerical value may be used.

Figure 9:
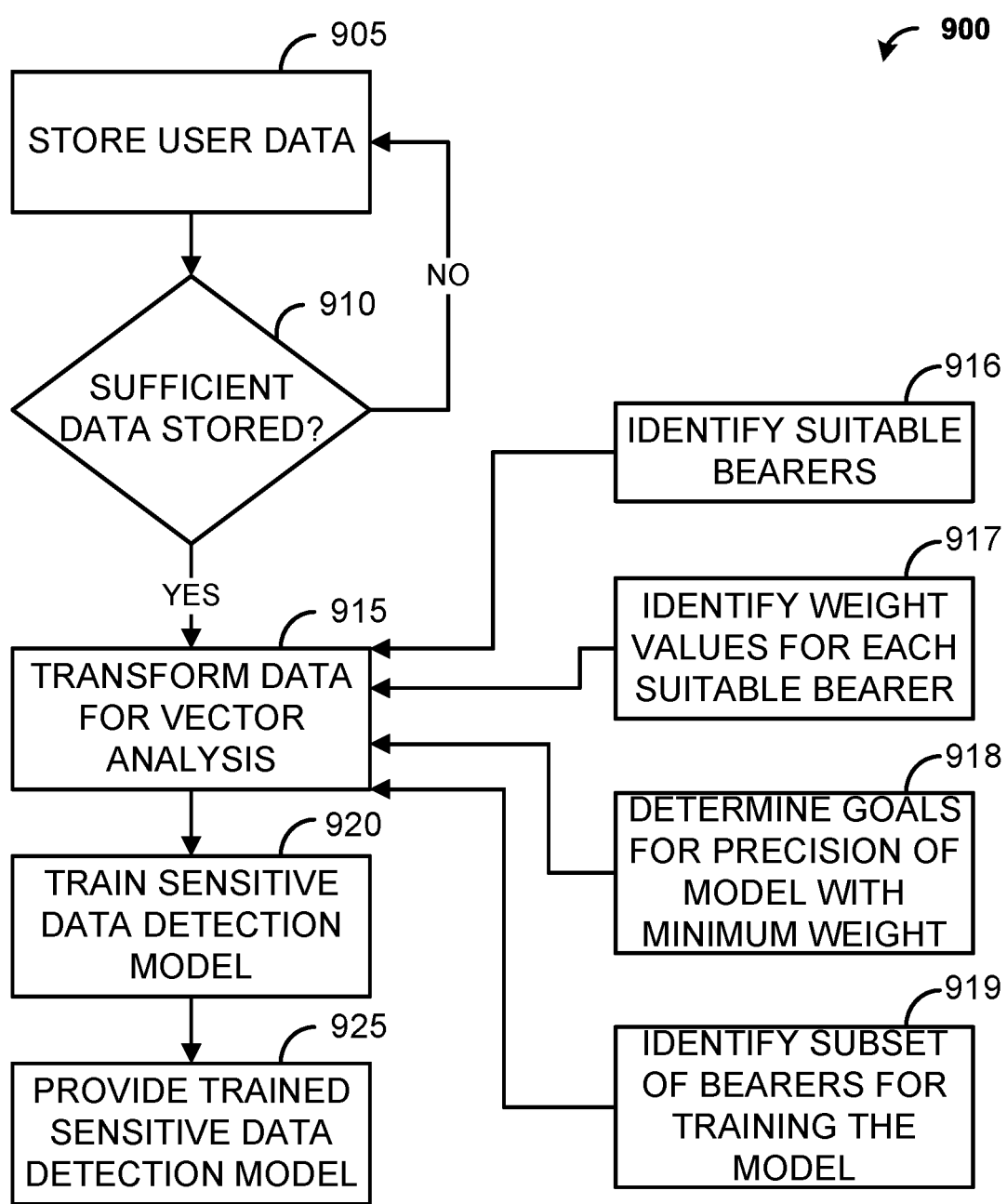
FIG. 9 shows a flowchart for an example method.

FIG. 9 shows a flowchart of an example method 900 for training a machine learning model to predict sensitive terms in items of text data. The methods described in FIG. 9 may be completed by a computing device, such as the computing device 101 or any other computing device described herein. While the method 900 of FIG. 9 will be described as being completed by the computing device 101 this is for example purposes only.

A user, via, for example, the computing device 106 associated with the user, may input user data. For example, the user data may comprise an item of text data. For example, the item of text data may comprise a line of computer code, a database entry, a database query, another form of data entry. For example, the user data may comprise user identifier. For example, the user identifier may comprise a user ID, a user name, a device ID (e.g., a URL, a MAC address) or another form of identifier that identifier the user submitting the user data. The user may depress the "enter" key, another carriage return key, or submit the text data for entry in another manner. The computing device 106 may send the user data to the computing device 101 via the network 104 or another network. The computing device 101 may receive the user data (e.g., the item of text data and the user ID) from the computing device 106.

At 905, the user data may be stored. For example, the user data may be stored by the computing device 101. For example, the user data may be stored in the training data 120 of the computing device 101. For example, the user data may be associated with the user identifier or may be stored with user data associated with a plurality of users.

At 910, a determination may be made as to whether there is sufficient user data stored. The determination may be made by the computing device 101, such as the training module 122. For example, the training module 122 may determine if there is sufficient user data for training data sets 210A-B and testing data sets to train a machine-learning model to predict sensitive data within user data. For example, the training module 122 may compare the number of items of user data to a model data threshold to determine if the model data threshold is satisfied (e.g., is greater than or greater than or equal to the threshold). If the model data threshold is not satisfied, the NO branch may be followed to 905 to continue receiving and storing user data. If the model data threshold is satisfied, the YES branch may be followed to 915.

At 915, the user data may be transformed for vector analysis. For example, each of the plurality of items of text data within the user data may be transformed for vector analysis. For example, the user data may be transformed by the computing device 101 (e.g., the bearing generator 116). For example, at 916, the computing device 101 may identify suitable bearers. For example, each suitable bearer may be associated with a bearing vectorization. For example, a bearer may be identified as suitable based on the type and format of the user data being transformed for vector analysis. For example, some user data may not include passwords or assignment values and thus, assignment bearing vectorization and password bearing vectorization would not be suitable for that particular user data. The computing device 101 may transform the user data into the one or more suitable bearing vectorizations. For example, the one or more suitable bearing vectorizations may comprise one or more of a position bearing vectorization, an assignment bearing vectorization, a keyword bearing vectorization, a threshold vectorization, or a password vectorization, as described above.

At 917, weight values for each suitable bearer (e.g., each type of suitable bearing vectorization) may be identified. For example, the weight values may be determine by the computing device 101 (e.g., bearing generator 116) or provided by a supervisor of the model creation via the computing device 101. For example, the weight value can be any value between 0-100, and more particularly between 0-5. For example, the amount of weight identified for each suitable bearer may be based on the complexity of the particular bearer. For example, positional bearing and assignment bearing may be less complex. As such, positional bearing and assignment bearing may be provided a higher weight value. For example, threshold bearing may be more complex. As such, the threshold bearing may be provided with a lower weight value. For example, the amount of weight value can also be based on one or more other factors including, but not limited to, reusability of the bearer, portability of the bearer, programmability of the bearer, and/or applicability of the bearer.

For example, reusability of the bearer may be determined based on how well the bearer is able to be used in other programming languages or syntax. For example, positional bearing is very easy to use no matter the programming language or syntax. For example, portability of the bearer may be determined based on how portable the bearer is to other programming languages or syntax with minimal changes. For example, assignment bearing may have a high portability as long as the assignment value(s) for each programming language or syntax may be determined. Programmability of the bearer may be determine based on whether programming language knowledge is in order to modify the bearer. For example, keyword bearing would require knowledge of the different programming language and the keywords for that different programming language. Applicability of the bearer may be determined based on whether domain knowledge is needed to modify the bearer. For example, password bearing may require domain knowledge in order to modify the bearer. For example, the object would be to minimize the weights applied to each bearing while achieving the accuracy threshold.

At 918, the goals for precision of the trained model 230 with minimum weights provided to the suitable bearers may be determined. For example, the goal may be the accuracy threshold for the trained model 230. For example, the goal may be to identify the best combination of bearers that will maximize the precision (e.g., true positives rate) for identifying sensitive terms within items of text data. For example, given a parameter S, which represents the set of all bearing vectorizations (e.g., position bearing, assignment bearing, keyword bearing, threshold bearing, password bearing, etc.);

a parameter n, which represents a finite set of items of text data; and a parameter G, which represents a goal function of maximizing the precision rate, given a set of S items numbered from 1-S, each with weight $w_i$ and value $v_i$, the goal function may be represented by the formula:

$$G = \text{maximize } v_i \in \frac{\sum_{i=1}^{n} p}{\sum_{i=1}^{n} p + f}$$

$$\text{Subject to minimize } \sum_{i=1}^{n} w_i x_i$$

Where the number $x_i$ of copies of each kind of bearing to include is zero or one; for n number of observations, p is the true positive and f is the false positive (whereby the true positive and false positive may be identified based on either manual or supervised learning based on pre-labeled data); and where $x_i \in \{0,1\}$ and $w_i \in N$ (in the same scale) is the weight associated with each bearing vectorization.

At 919, the subset of bearers for training the model may be identified. For example, the subset of bearers may be identified by the computing device 101 (e.g., training module 122). For example, less than all of the suitable bearers may be implemented for evaluating the user data (e.g., the plurality of items of text data) using the training module 122. For example, based on the determined goals, one or more of the suitable bearers may not provide assistance in identifying potential sensitive data with a reasonable probability of success.

At 920, the sensitive data (e.g., sensitive term) detection model may be trained. For example, the sensitive data detection model may be trained by the training module 122 of the computing device 101. For example, the sensitive data detection model may be trained using all or any portion of the training data 120. For example, the training data 120 may comprise the user data (e.g., the plurality of items of text data). For example, the sensitive data detection module may be trained based on the determined goal and the goal function. For example, one or more trained models may be determined or created. For example, a trained model may be user specific.

At 925, the trained sensitive data detection model may be provided for analyzing subsequent items of text data input by users to determine if those items of text data include one or more sensitive terms. For example, the trained sensitive data detection model may be provided by the computing device 101 and used by the computing device 101 (e.g. the background agent 117) or the computing device 106.

Figure 10:
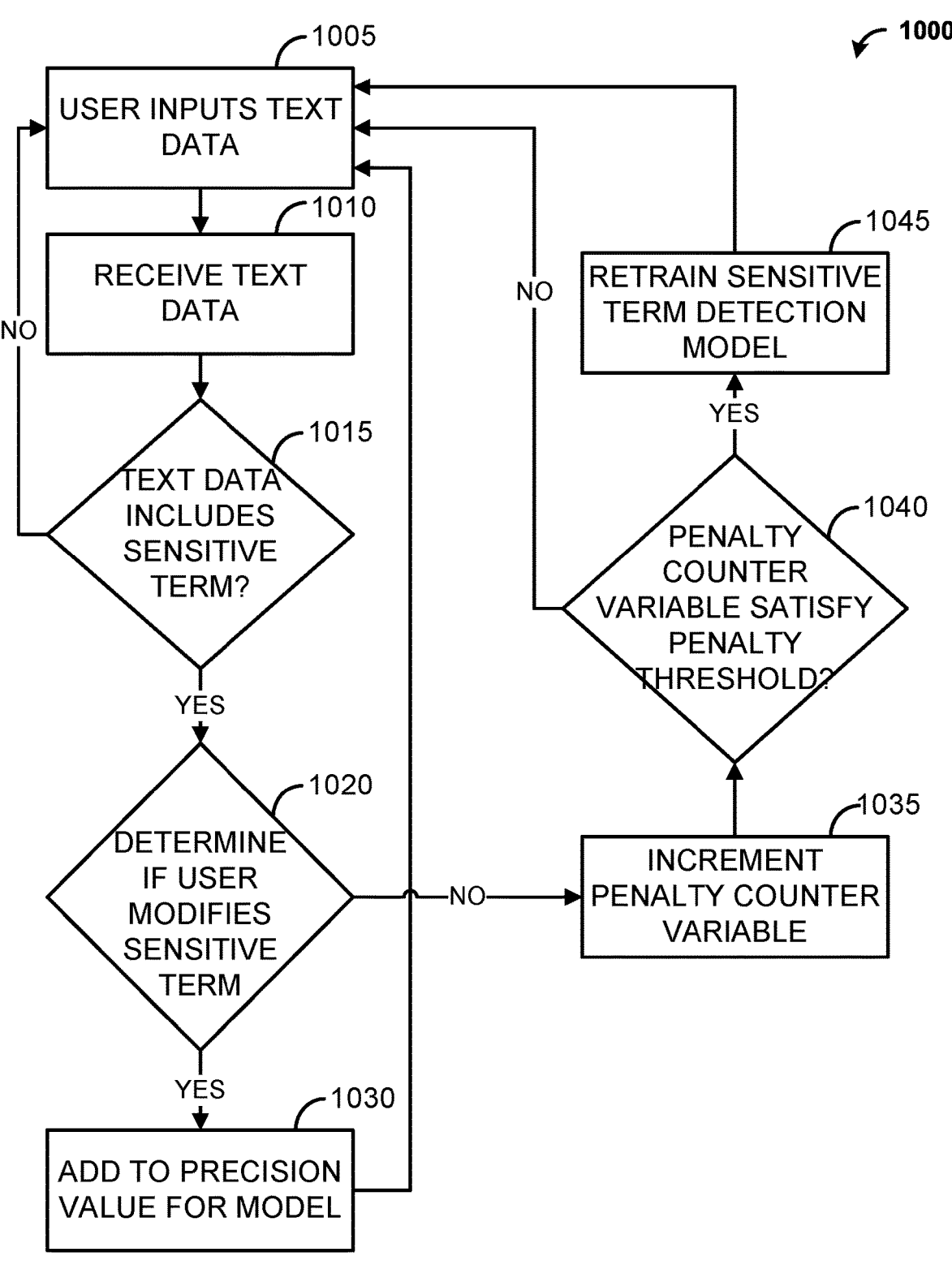
FIG. 10 shows a flowchart for an example method.

FIG. 10 shows a flowchart of an example method 1000 for determining if an item of text data includes a sensitive term. The methods described in FIG. 10 may be completed by a computing device, such as the computing device 101 or any other computing device described herein. While the method 1000 of FIG. 10 will be described as being completed by the computing device 101 this is for example purposes only.

At 1005, a user, via, for example, the computing device 106 associated with the user, may input an item of text data. For example, the item of text data may comprise a line of computer code, a database entry, a database query, or another form of data entry. For example, the item of text data may be associated with a user identifier. For example, the user identifier may comprise a user ID, a user name, a device ID (e.g., a URL, a MAC address) or another form of identifier that identifier the user submitting the user data. The user may depress the "enter" key, another carriage return key, or submit the item of text data for entry in another manner. The computing device 106 may send the item of text data to the computing device 101 via the network 104 or another network.

At 1010, the computing device 101 (e.g., the background agent 117) may receive the item of text data. The item of text data may be received from the computing device 106 via the network 104 or another network. For example, the background agent 117 may receive the user identifier associated with the item of text data from the computing device 106 via the network 104 or another network.

At 1015, a determination may be made as to whether the item of text data includes a sensitive term (e.g., a secret, confidential data, a password, etc.). For example, the determination may be made by the computing device 101 (e.g., the background agent 117). For example, the computing device 101 (e.g., the bearing generator 116) may transform the item of text data for vector analysis based on the identified subset of bearers at 919 of FIG. 9. For example, the identified subset of bearers may comprise one or more of a position bearing vectorization of the item of text data, an assignment bearing vectorization of the item of text data, a keyword bearing vectorization of the item of text data, a threshold vectorization of the item of text data, or a password vectorization of the item of text data, as described above in FIGS. 4-8. For example, the computing device 101 (e.g., the bearing generator 116) may transform the item of text data into a vector form as described above. For example, the item of text data 400 of int[ ] secrettoken={13, 14, 15}, whereby the position bearing vectorization, the assignment bearing vectorization, the keyword bearing vectorization, and the threshold vectorization are identified as the subset of bearers for the trained model may generate the following vector form for the item of text data 400: [1-111, 2-112, 3-113, 4-101, 5-012, 6-113, 7-101, 8-102, 9-103, 10-111].

The vector form of the item of text data 400 may be evaluated by the background agent 117 using the trained model 230 to determine a probability that the item of text data 400 comprises a possible sensitive term and the identity of the possible sensitive term. For example, the background agent 117, using the trained model 230, may determine that the item of text data includes a possible sensitive term if the probability that a particular element 505*a-j* of the item of text data 400 is a sensitive term satisfies a model threshold (e.g., is greater than or greater than or equal to the model threshold).

Based on the probability for each element 505*a-j* of the item of text data 400 comprising a sensitive term not satisfying the model threshold (or satisfying a no sensitive term threshold) the NO branch may be followed to 1005 to receive additional inputs of items of text data from the user associated with the computing device 106. Based on the probability for at least one element 505*a-j* of the item of text data 400 satisfying the model threshold, the YES branch may be followed to 1020. Furthermore, based on the probability for at least one element 505*a-j* of the item of text data 400 satisfying the model threshold, the computing device 101 (e.g., the background agent 117) may cause an indication of the potential sensitive term to be output. For example, the indication for the potential sensitive term may be output on a display associated with the computing device 106. For example, the indication of the potential sensitive term may comprise the one or more elements for which the probability satisfied the model threshold. For example, the indication of the potential sensitive term may be sent from the computing device 101 to the computing device 106 via the network 104 or another network. For example, the indication of the potential sensitive term may comprise a text warning, such as "WARNING—the most recent item of text data entered may include a sensitive term," or other similar alert. For example, the indication of the potential sensitive term may comprise a sound (e.g., a beep, buzz, a siren, etc.) providing an audible output of the indication of the potential sensitive in the item of text data 400.

At 1020, a determination may be made as to whether the user modified the item of text data 400 to remove the possible sensitive term identified at 1015. For example, the determination may be made by the computing device 101 (e.g., the background agent). For example, the background agent 117 may determine if the item of text data 400 is modified and if that modification removes the possible sensitive term from the item of text data 400. For example, the background agent 117 may receive a second input of the item of text data. For example, the background agent 117 may compare the item of text data 400 to the second input of the item of text data to determine if the second input of the item of text data matches portions of the item of text data 400 and/or if the identified possible sensitive term was removed or not included in the second input of the item of text data.

If the background agent 117 determines that the user modified the item of text data 400 to remove or modify the possible sensitive term, then the YES branch may be followed to 1030, where a precision value for the trained model may be incremented by the background agent 117.

For example, if the background agent 117 determines that the user modified the item of text data 400 to remove or modify the possible sensitive term, then the possible sensitive term may be determined to be a sensitive term. For example, a representation of the determined sensitive term may be generated. For example, the representation may be any one or more of the determined sensitive term, a singular version of the determined sensitive term, a plural version of the determined sensitive term, a gender-neutral form of the determined sensitive term, a form of the determined sensitive term that removes any prefixes or suffixes from the determined sensitive term, or the like. For example, the representation of the determined sensitive term may be embedded into the document, code, text data, or software being evaluated. The representation may be used, for example by the background agent 117, to determine other sensitive terms in the text data. For example, the background agent 117 may compare the representation to additional text within the text data in order to identify additional sensitive terms. For example, if any of the additional text matches or substantially matches the representation, the additional text data may be determined or indicated as a potential sensitive term and handled as described above in 1015-1020 or may automatically be determined to be a sensitive term.

The method 1000 may then proceed to 1005 to receive further items of text data from the computing device 106 associated with the user. If the background agent 117 determines that the user does not modify the item of text data 400 to remove the possible sensitive term (e.g., a second input of the item of text data was not received that matches portions of the item of text data 400 with the possible sensitive term removed or modified or an indication is received from the computing device 106 that the item of text data 400 will not be modified (e.g., user selects a radio button indicating no modification is needed)), the NO branch may be followed to 1035.

At 1035, a penalty counter variable may be incremented. For example, the penalty counter variable may be incremented by the computing device 101 (e.g., the background agent 117). For example, the penalty counter variable may represent the number of false positive indications of a sensitive term within a received item of text data when evaluated using the trained model 230. For example, the false positive indication may be inferred based on the user not modifying or removing the possible sensitive term in response to the background agent 117 causing the output of the indication of the potential sensitive term at the computing device 106. For example, the penalty counter variable may be an integer value that increments or increases by a value of one when the background agent 117 determines that the user does not modify the item of text data 400 to remove or modify the potential sensitive term.

At 1040, a determination is made as to whether the penalty counter variable satisfies (e.g., is greater than or greater than or equal to) a penalty threshold. For example, the determination may be made by the computing device 101 (e.g., the background agent 117). For example, the background agent 117 may compare the penalty counter variable to the penalty threshold to determine of the penalty threshold is satisfied. For example, based on the penalty counter variable not satisfying the penalty threshold, the NO branch may be followed to 1005. For example, based on the penalty counter variable satisfying the penalty threshold, the YES branch may be followed to 1045.

At 1045, the sensitive term detection model (e.g., the trained model 230) may be retrained based on additional items of text data. For example, the additional items of text data may be associated only with the user that input the item of text data in 1005 or with a plurality of users who have submitted a plurality of additional items of text data. Based on the trained model 230 being retrained, the method 1000 may proceed to 1005 to receive additional inputs of items of text data from the user.

Figure 11:
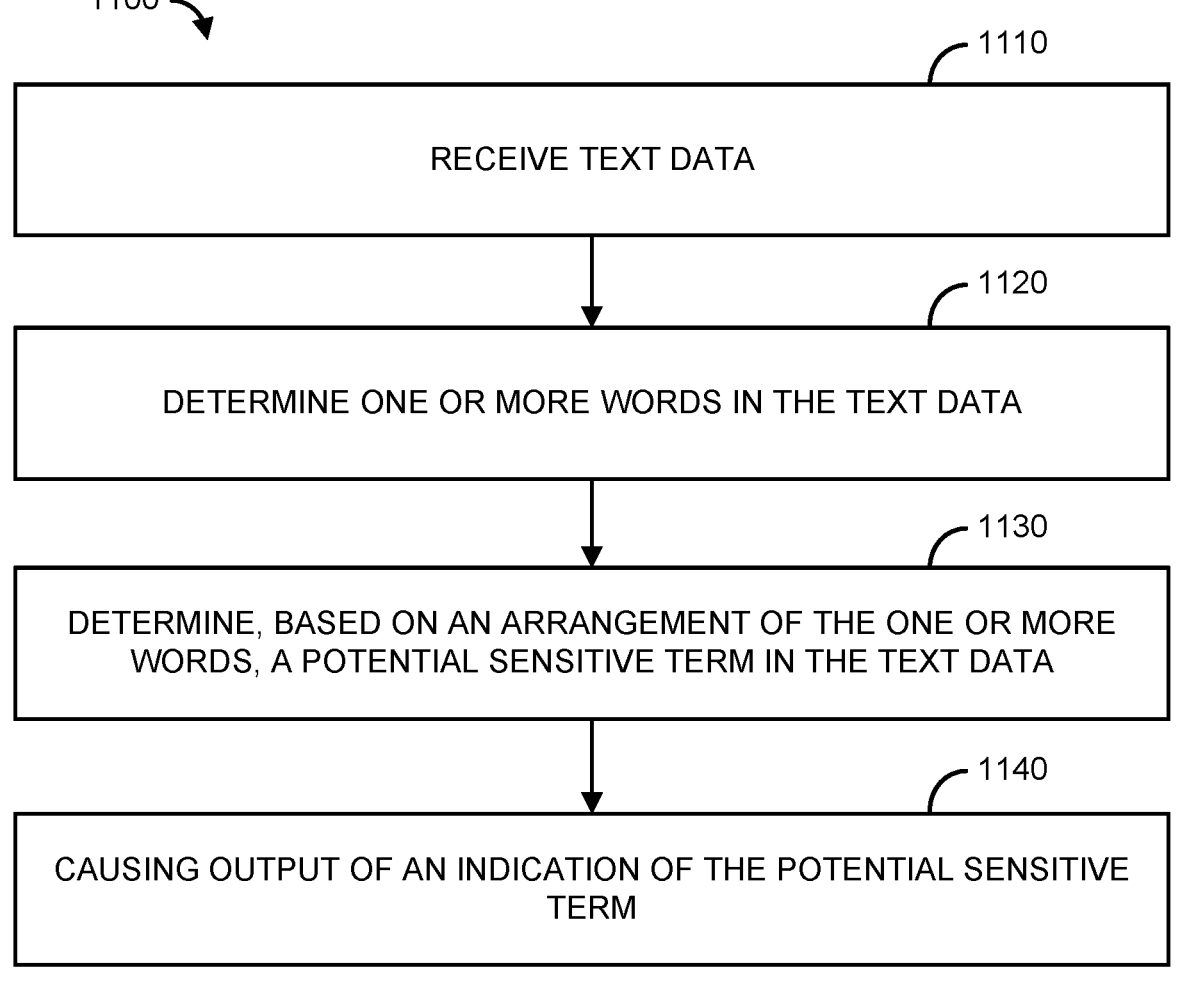
FIG. 11 shows a flowchart for an example method.

FIG. 11 shows a flowchart of an example method 1100 for determining if an item of text data includes a sensitive term. The methods described in FIG. 11 may be completed by a computing device, such as the computing device 101 or any other computing device described herein. While the method 1100 of FIG. 11 will be described as being completed by the computing device 101 this is for example purposes only.

At 1110, an item of text data may be received. For example, the item of text data may be received by the computing device 101 (e.g., the background agent 117). For example, the item of text data may be received from the computing device 106 via the network 104 or another network. For example, a user, via the computing device 106 associated with the user, may input the item of text data in the computing device 106. For example, the item of text data may comprise a line of computer code, a database entry, a database query, or another form of data entry. The user may depress the "enter" key, another carriage return key, or submit the item of text data for entry at the computing device 106 in another manner.

For example, the background agent 117 may receive a user identifier associated with the item of text data from the computing device 106 via the network 104 or another network. For example, the user identifier may comprise a user ID, a user name, a device ID (e.g., a URL, a MAC address) or another form of identifier that identifier the user submitting the user data.

At 1120, one or more words in the item of text data may be determined. For example, the one or more words may be determined by the computing device 101 (e.g., the bearing generator 116). For example, the bearing generator 116 may evaluate each element (e.g., elements 505*a-j* of FIGS. 5-8) in the received item of text data (e.g., the item of text data

400 of FIG. 4) to determine the word elements (e.g., word element 405*c*) and the non-word elements (e.g., non-word elements 405*a-b* and 405*d*).

At 1130, a potential sensitive term may be determined to be in the item of text data. For example, the potential sensitive term may be determined by the computing device 101 (e.g., the background agent 117). For example, the sensitive term may be one or more of a secret, confidential data, or a password. For example, the potential sensitive term may be determined based on an evaluation of the item of text data by a trained model (e.g., the trained model 230). For example, the potential sensitive term may be determined based on an arrangement of the one or more words in the item of text data. For example, the arrangement of the one or more words may be with reference to another word element or a non-word element. For example, the arrangement of the one or more words may be with reference to an assignment value within the item of text data.

For example, an arrangement of the one or more words may be determined based on an assignment or arrangement bearing vectorization for the item of text data as substantially described with reference to FIG. 6. The assignment bearing vectorization for the item of text data may be generated by the bearing generator 116. For example, assignment bearing vectorization on the item of text data 400 may facilitate an evaluation of the arrangement of elements 505*a*-505*j* within the item of text data 400. For example, how the elements 505*a*-505*j*, especially word elements such as the sensitive term 505*d*, are arranged within the item of text data, such as with regard to an assignment element 505*e* within the item of text data 400, may indicate the probability, based on arrangement, of the sensitive term within the item of text data 400. For example, generating an assignment bearing allows the background agent 117 to use a trained model 230 to determine information regarding the position or arrangement of elements 505*a*-505*d* and 505*f*-505*j* before and after the assignment element 505*e*. For example, the assignment element 505*e* may be an "=," a ":," or any other element for assigning the value of its right-hand operand positioned to the right of the assignment element to a variable, a property, or an indexer element given by its left-hand operand positioned to the left of the assignment element. For example, the assignment element 505*e* may be any other symbol or keyword according to the context of the corpus of the plurality of items of text data 400.

For example, within the assignment bearing vectorization, the assignment element 505*e* may be assigned a first value. For example, the first value may be zero, however in other examples, a different numerical value may be used. For example, the elements 505*a-d* to the left (e.g., on the left side) of the assignment element 505*e* within the item of text data 400 may each be assigned a second value. For example, the second value may be (−1), however in other examples, a different numerical value may be used. For example, the elements 505*f-j* to the right (e.g., on the right side) of the assignment element 505*e* within the time of text data 400 may each be assigned a third value. For example, the third value may be (1), however in other examples, a different numerical value may be used.

For example, the potential sensitive term may be determined based on a position of the one or more words within the item of text data. For example, the position of each of the one or more words may be determined based on a position bearing vectorization for the item of text data (e.g., the item of text data 400) as substantially described with reference to FIG. 5. The position bearing vectorization 500 for the item of text data 400 may be generated by the bearing generator 116. For example, position bearing vectorization on the item of text data 400 may facilitate an evaluation of the probability of a sensitive term in different positions within the item of text data 400. For example, the position of each element may be determined starting on the left side of the item of text data 400. However, in other examples, the position of each element may be determined starting on the right side of the item of text data 400.

For example, the bearing generator 116 may separate each element 505a-505j of the item of text data 400. When separating each element 505a-505j, the bearing generator 116 may not separate a word into discrete letters or a number into discrete numerals. Furthermore, the bearing generator 116 may not separate commands into discrete letters. For each element 505a-505j of the item of text data 400, a position number 510a-510j may be assigned. For example, the first element 505a "Int" in the item of text data 400 may be assigned the vector position variable 1 510a to represent it as being the element 505a in the first position in the item of text data 400. For example, the second element 505b "[" in the item of text data 400 may be assigned the vector position variable 2 510b to represent it as being the element 505b in the second position in the item of text data 400 and so on until the end of the item of text data is reached.

For example, the potential sensitive term may be determined by the background agent 117 based on keywords within the item of text data and associated with the programming language or syntax used for the item of text data. For example, the keywords within the item of text data may be determined based on a keyword bearing vectorization for the item of text data (e.g., the item of text data 400) as substantially described with reference to FIG. 7. For example, the potential sensitive term may be determined based on an n-gram threshold used to evaluate the item of text data. For example, the n-gram threshold may be used to generate a threshold bearing vectorization for the item of text data 400 as substantially described with reference to FIG. 8. For example, the potential sensitive term may be determined based on one or more common passwords within the item of text data. For example, the common passwords within the item of text data may be determined based on a password bearing vectorization for the item of text data 400 as substantially described above. Depending on which bearers are determined to be suitable (as discussed in FIG. 9) for the trained model, the computing device 101 (e.g., the bearing generator 116) may transform the item of text data into a vector form as described above. For the example item of text data 400 of int[ ] secrettoken={13, 14, 15}, whereby the position bearing vectorization, the assignment bearing vectorization, the keyword bearing vectorization, and the threshold vectorization are identified as the suitable bearers for the trained model may generate the following vector form for the item of text data 400: [1-111, 2-112, 3-113, 4-101, 5-012, 6-113, 7-101, 8-102, 9-103, 10-111]. This vector form of the item of text data 400 may be evaluated by the background agent 117 using the trained model 230 to determine if the item of text data includes a potential sensitive term. The vector form of the item of text data 400 may be evaluated by the trained model 230 to determine a probability that the item of text data 400 comprises a possible sensitive term and the identity of the possible sensitive term. For example, the trained model 230 may determine that the item of text data includes a possible sensitive term if the probability that a particular element 505a-j of the item of text data 400 is a sensitive term satisfies a model threshold (e.g., is greater than or greater than or equal to the model threshold).

At 1140, an indication of the potential sensitive term may be output or caused to be output. For example, the indication may be output or caused to be output by the computing device 101 (e.g., the background agent 117). For example, the indication for the potential sensitive term may be caused to be output on a display associated with the computing device 106. For example, the indication of the potential sensitive term may comprise the one or more elements for which the probability satisfied the model threshold. For example, the indication of the potential sensitive term may be sent from the background agent 117 to the computing device 106 via the network 104 or another network. For example, the indication of the potential sensitive term may comprise a text warning, such as "WARNING—the most recent item of text data entered may include a sensitive term," or other similar alert. For example, the indication of the potential sensitive term may comprise a sound (e.g., a beep, buzz, a siren, etc.) providing an audible output of the indication of the potential sensitive in the item of text data 400.

A determination may be made as to whether the user modified the item of text data 400 to remove the possible sensitive term. For example, the determination may be made by the background agent 117. For example, the background agent 117 may determine if the item of text data 400 is modified and if that modification removes the possible sensitive term. For example, the background agent 117 may receive a second input of the item of text data and may compare the item of text data 400 to the second input of the item of text data to determine if the second input of the item of text data matches portions of the item of text data 400 and/or if the identified possible sensitive term was removed or not included in the second input of the item of text data.

If the background agent 117 determines that the user does not modify the item of text data 400 to remove the possible sensitive term (e.g., a second input of the item of text data was not received that matches portions of the item of text data 400 with the possible sensitive term removed or modified or an indication is received from the computing device 106 that the item of text data 400 will not be modified (e.g., user selects a radio button indicating no modification is needed)) a penalty counter variable may be incremented by the background agent 117. For example, the penalty counter variable may represent the number of false positive indications of a sensitive term within a received item of text data when evaluated using the trained model 230. For example, the penalty counter variable may be incremented or increased by a value of one when the background agent 117 determines that the user does not modify the item of text data 400 to remove or modify the potential sensitive term.

The penalty counter variable may be compared to a penalty threshold to determine if the penalty counter variable satisfies (e.g., is greater than or greater than or equal to) the penalty threshold. For example, based on the penalty counter variable satisfying the penalty threshold, the trained sensitive term detection model (e.g., the trained model 230) may be retrained based on additional items of text data. For example, the additional items of text data may be associated only with the user that input the item of text data or with a plurality of users who have submitted a plurality of additional items of text data.

For example, if the background agent 117 determines that the user modified the item of text data 400 to remove or modify the possible sensitive term, then the possible sensitive term may be determined to be a sensitive term. For example, a representation of the determined sensitive term may be generated (e.g., by the background agent 117). For example, the representation may be any one or more of the determined sensitive term, a singular version of the determined sensitive term, a plural version of the determined sensitive term, a gender-neutral form of the determined sensitive term, a form of the determined sensitive term that removes any prefixes or suffixes from the determined sensitive term, or the like. For example, the representation of the determined sensitive term may be embedded into the document, code, text data, or software being evaluated. The representation may be used, for example by the background agent 117, to determine other sensitive terms in the text data. For example, the background agent 117 may compare the representation to additional text within the text data in order to identify additional sensitive terms. For example, if any of the additional text matches or substantially matches (e.g. the base portion of the word in the additional text matches the base portion of the representation, such as plural and singular versions of the word would be a substantial match) the representation, the additional text data may be determined or indicated as a potential sensitive term and handled as described above in 1015-1020 or may automatically be determined to be a sensitive term by the background agent 117.

Figure 12:
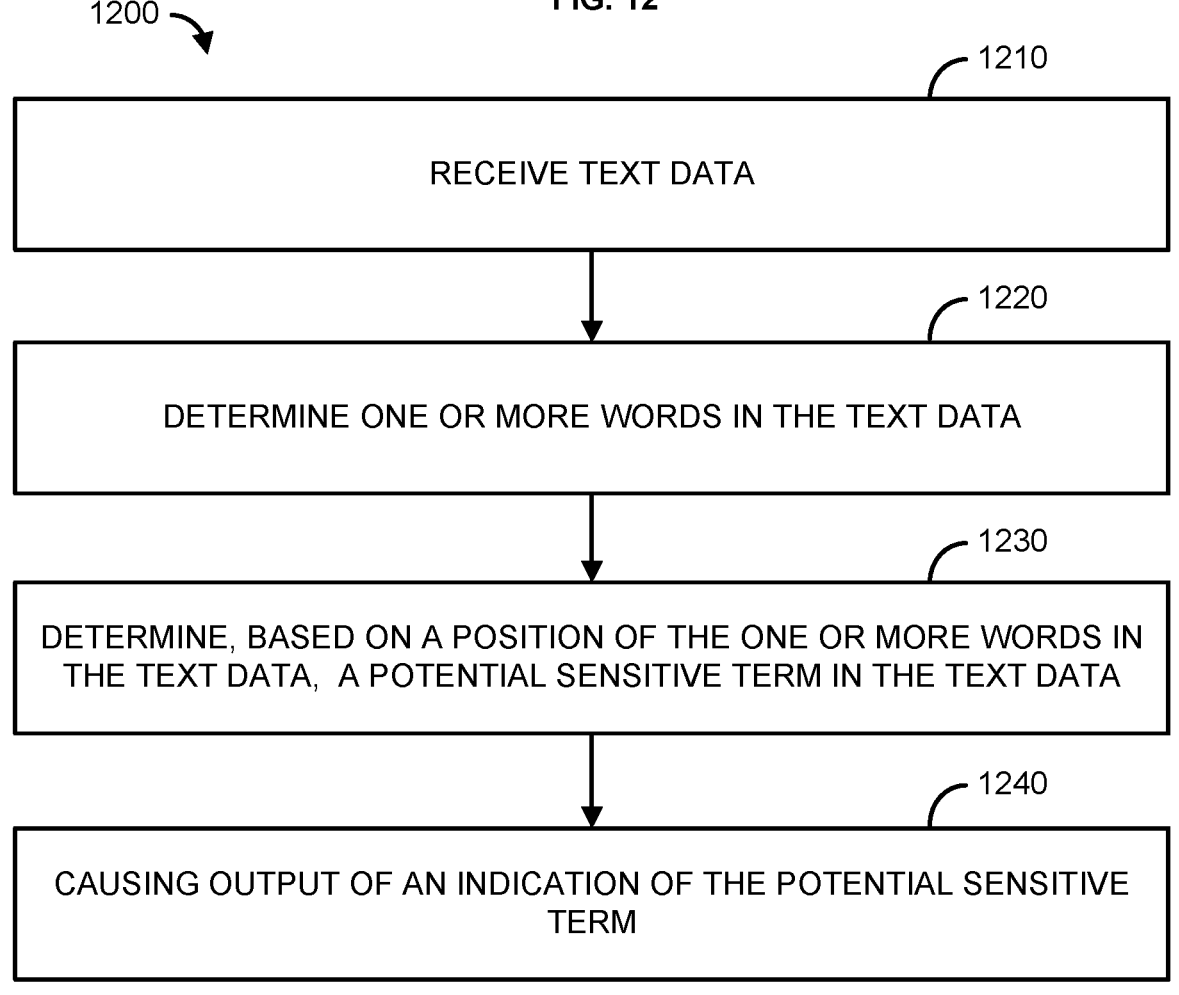
FIG. 12 shows a flowchart for an example method.

FIG. 12 shows a flowchart of an example method 1200 for determining if an item of text data includes a sensitive term. The methods described in FIG. 12 may be completed by a computing device, such as the computing device 101 or any other computing device described herein. While the method 1200 of FIG. 12 will be described as being completed by the computing device 101 this is for example purposes only.

At 1210, an item of text data may be received. For example, the item of text data may be received by the computing device 101 (e.g., the background agent 117). For example, the item of text data may be received from the computing device 106 via the network 104 or another network. For example, a user, via the computing device 106 associated with the user, may input the item of text data in the computing device 106. For example, the item of text data may comprise a line of computer code, a database entry, a database query, or another form of data entry. The user may depress the "enter" key, another carriage return key, or submit the item of text data for entry at the computing device 106 in another manner.

For example, the background agent 117 may receive a user identifier associated with the item of text data from the computing device 106 via the network 104 or another network. For example, the user identifier may comprise a user ID, a user name, a device ID (e.g., a URL, a MAC address) or another form of identifier that identifier the user submitting the user data.

At 1220, one or more words in the item of text data may be determined. For example, the one or more words may be determined by the computing device 101 (e.g., the bearing generator 116). For example, the bearing generator 116 may evaluate each element (e.g., elements 505*a-j* of FIGS. 5-8) in the received item of text data (e.g., the item of text data 400 of FIG. 4) to determine the word elements (e.g., word element 405*c*) and the non-word elements (e.g., non-word elements 405*a-b* and 405*d*).

At 1230, a potential sensitive term may be determined to be in the item of text data. For example, the potential sensitive term may be determined by the computing device 101 (e.g., the background agent 117). For example, the sensitive term may be one or more of a secret, confidential data, or a password. For example, the potential sensitive term may be determined based on an evaluation of the item of text data by a trained model (e.g., the trained model 230). For example, the potential sensitive term may be determined based on a position of the one or more words within the item of text data. For example, the position of each of the one or more words may be determined based on a position bearing vectorization for the item of text data (e.g., the item of text data 400) as substantially described with reference to FIG. 5. The position bearing vectorization 500 for the item of text data 400 may be generated by the bearing generator 116. For example, position bearing vectorization on the item of text data 400 may facilitate an evaluation of the probability of a sensitive term in different positions within the item of text data 400. For example, the position of each element may be determined starting on the left side of the item of text data 400. However, in other examples, the position of each element may be determined starting on the right side of the item of text data 400.

For example, the bearing generator 116 may separate each element 505*a*-505*j* of the item of text data 400. When separating each element 505*a*-505*j*, the bearing generator 116 may not separate a word into discrete letters or a number into discrete numerals. Furthermore, the bearing generator 116 may not separate commands into discrete letters. For each element 505*a*-505*j* of the item of text data 400, a position number 510*a*-510*j* may be assigned. For example, the first element 505*a* "Int" in the item of text data 400 may be assigned the vector position variable 1 510*a* to represent it as being the element 505*a* in the first position in the item of text data 400. For example, the second element 505*b* "[" in the item of text data 400 may be assigned the vector position variable 2 510*b* to represent it as being the element 505*b* in the second position in the item of text data 400 and so on until the end of the item of text data is reached.

For example, the potential sensitive term may be determined by the background agent 117 based on an arrangement of the one or more words in the item of text data. For example, the arrangement of the one or more words may be with reference to another word element or a non-word element. For example, the arrangement of the one or more words may be with reference to an assignment value within the item of text data. For example, an arrangement of the one or more words may be determined based on an assignment or arrangement bearing vectorization for the item of text data as substantially described with reference to FIG. 6. The assignment bearing vectorization for the item of text data may be generated by the bearing generator 116. For example, assignment bearing vectorization on the item of text data 400 may facilitate an evaluation of the arrangement of elements 505*a*-505*j* within the item of text data 400. For example, how the elements 505*a*-505*j*, especially word elements such as the sensitive term 505*d*, are arranged within the item of text data, such as with regard to an assignment element 505*e* within the item of text data 400, may indicate the probability, based on arrangement, of the sensitive term within the item of text data 400. For example, generating an assignment bearing allows the trained model 230 to determine information regarding the position or arrangement of elements 505*a*-505*d* and 505*f*-505*j* before and after the assignment element 505*e*. For example, the assignment element 505*e* may be an "=," a ":," or any other element for assigning the value of its right-hand operand positioned to the right of the assignment element to a variable, a property, or an indexer element given by its left-hand operand positioned to the left of the assignment element. For example, the assignment element 505*e* may be any other symbol or keyword according to the context of the corpus of the plurality of items of text data 400.

For example, within the assignment bearing vectorization, the assignment element 505e may be assigned a first value. For example, the first value may be zero, however in other examples, a different numerical value may be used. For example, the elements 505a-d to the left (e.g., on the left side) of the assignment element 505e within the item of text data 400 may each be assigned a second value. For example, the second value may be (–1), however in other examples, a different numerical value may be used. For example, the elements 505f-j to the right (e.g., on the right side) of the assignment element 505e within the time of text data 400 may each be assigned a third value. For example, the third value may be (1), however in other examples, a different numerical value may be used.

For example, the potential sensitive term may be determined by the background agent 117 based on keywords within the item of text data and associated with the programming language or syntax used for the item of text data. For example, the keywords within the item of text data may be determined based on a keyword bearing vectorization for the item of text data (e.g., the item of text data 400) as substantially described with reference to FIG. 7. For example, the potential sensitive term may be determined based on an n-gram threshold used to evaluate the item of text data. For example, the n-gram threshold may be used to generate a threshold bearing vectorization for the item of text data 400 as substantially described with reference to FIG. 8. For example, the potential sensitive term may be determined based on one or more common passwords within the item of text data. For example, the common passwords within the item of text data may be determined based on a password bearing vectorization for the item of text data 400 as substantially described above. Depending on which bearers are determined to be suitable (as discussed in FIG. 9) for the trained model, the computing device 101 (e.g., the bearing generator 116) may transform the item of text data into a vector form as described above. For the example item of text data 400 of int[ ] secrettoken={13, 14, 15}, whereby the position bearing vectorization, the assignment bearing vectorization, the keyword bearing vectorization, and the threshold vectorization are identified as the suitable bearers for the trained model may generate the following vector form for the item of text data 400: [1-111, 2-112, 3-113, 4-101, 5-012, 6-113, 7-101, 8-102, 9-103, 10-111]. This vector form of the item of text data 400 may be evaluated by the trained model 230 to determine if the item of text data includes a potential sensitive term. The vector form of the item of text data 400 may be evaluated by the trained model 230 to determine a probability that the item of text data 400 comprises a possible sensitive term and the identity of the possible sensitive term. For example, the trained model 230 may determine that the item of text data includes a possible sensitive term if the probability that a particular element 505a-j of the item of text data 400 is a sensitive term satisfies a model threshold (e.g., is greater than or greater than or equal to the model threshold).

At 1240, an indication of the potential sensitive term may be output or caused to be output. For example, the indication may be output or caused to be output by the computing device 101 (e.g., the background agent 117). For example, the indication for the potential sensitive term may be caused to be output on a display associated with the computing device 106. For example, the indication of the potential sensitive term may comprise the one or more elements for which the probability satisfied the model threshold. For example, the indication of the potential sensitive term may be sent from the background agent 117 to the computing device 106 via the network 104 or another network. For example, the indication of the potential sensitive term may comprise a text warning, such as "WARNING—the most recent item of text data entered may include a sensitive term," or other similar alert. For example, the indication of the potential sensitive term may comprise a sound (e.g., a beep, buzz, a siren, etc.) providing an audible output of the indication of the potential sensitive in the item of text data 400.

A determination may be made as to whether the user modified the item of text data 400 to remove the possible sensitive term. For example, the determination may be made by the background agent 117. For example, the background agent 117 may determine if the item of text data 400 is modified and if that modification removes the possible sensitive term. For example, the background agent 117 may receive a second input of the item of text data and may compare the item of text data 400 to the second input of the item of text data to determine if the second input of the item of text data matches portions of the item of text data 400 and/or if the identified possible sensitive term was removed or not included in the second input of the item of text data.

If the background agent 117 determines that the user does not modify the item of text data 400 to remove the possible sensitive term (e.g., a second input of the item of text data was not received that matches portions of the item of text data 400 with the possible sensitive term removed or modified or an indication is received from the computing device 106 that the item of text data 400 will not be modified (e.g., user selects a radio button indicating no modification is needed)) a penalty counter variable may be incremented by the background agent 117. For example, the penalty counter variable may represent the number of false positive indications of a sensitive term within a received item of text data when evaluated using the trained model 230. For example, the penalty counter variable may be incremented or increased by a value of one when the background agent 117 determines that the user does not modify the item of text data 400 to remove or modify the potential sensitive term.

The penalty counter variable may be compared to a penalty threshold to determine if the penalty counter variable satisfies (e.g., is greater than or greater than or equal to) the penalty threshold. For example, based on the penalty counter variable satisfying the penalty threshold, the trained sensitive term detection model (e.g., the trained model 230) may be retrained based on additional items of text data. For example, the additional items of text data may be associated only with the user that input the item of text data or with a plurality of users who have submitted a plurality of additional items of text data.

For example, if the background agent 117 determines that the user modified the item of text data 400 to remove or modify the possible sensitive term, then the possible sensitive term may be determined to be a sensitive term. For example, a representation of the determined sensitive term may be generated (e.g., by the background agent 117). For example, the representation may be any one or more of the determined sensitive term, a singular version of the determined sensitive term, a plural version of the determined sensitive term, a gender-neutral form of the determined sensitive term, a form of the determined sensitive term that removes any prefixes or suffixes from the determined sensitive term, or the like. For example, the representation of the determined sensitive term may be embedded into the document, code, text data, or software being evaluated. The representation may be used, for example by the background agent 117, to determine other sensitive terms in the text data. For example, the background agent 117 may compare the representation to additional text within the text data in order to identify additional sensitive terms. For example, if any of the additional text matches or substantially matches (e.g. the base portion of the word in the additional text matches the base portion of the representation, such as plural and singular versions of the word would be a substantial match) the representation, the additional text data may be determined or indicated as a potential sensitive term and handled as described above in 1015-1020 or may automatically be determined to be a sensitive term by the background agent 117.

Figure 13:
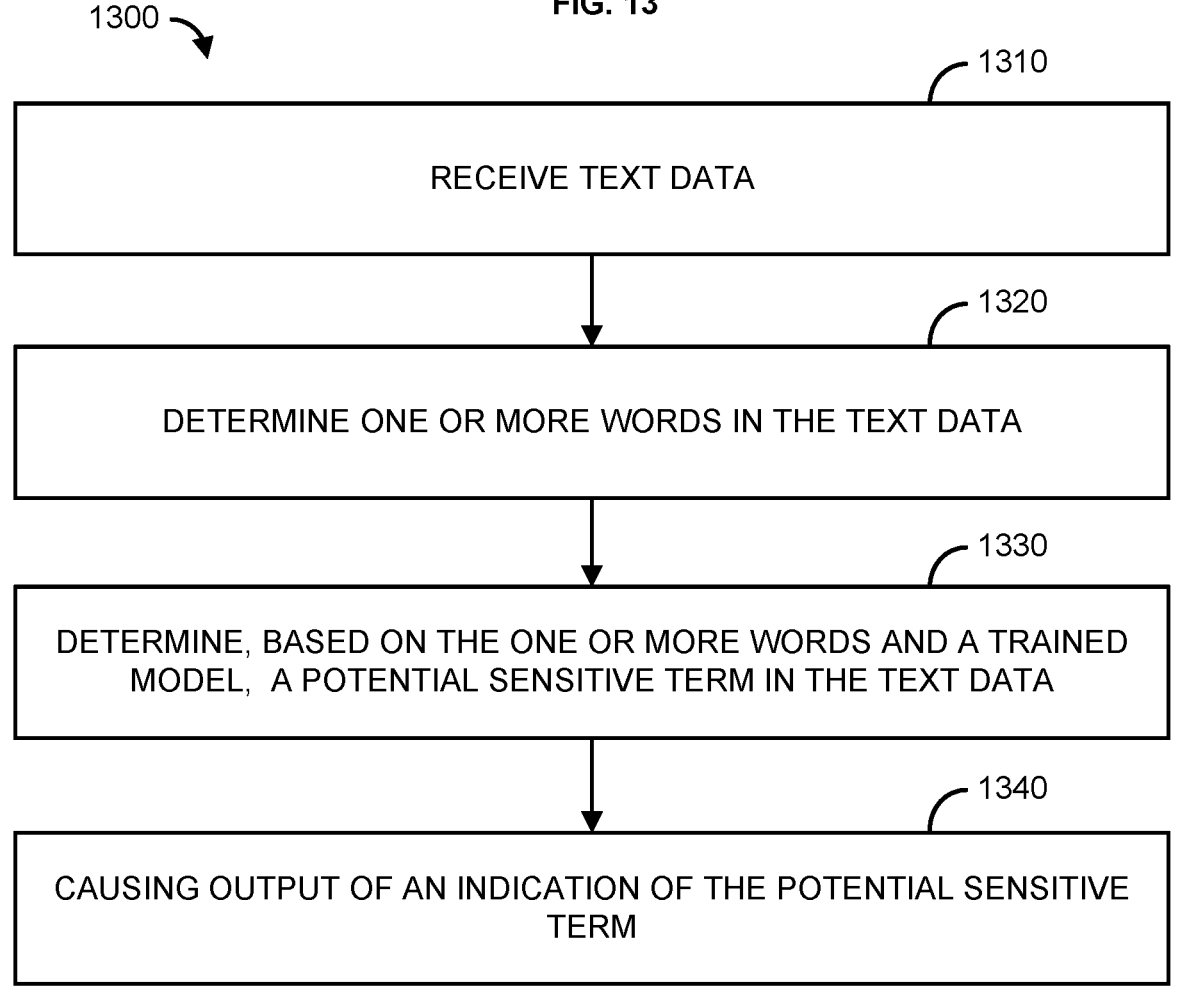
FIG. 13 shows a flowchart for an example method.

FIG. 13 shows a flowchart of an example method 1300 for determining if an item of text data includes a sensitive term. The methods described in FIG. 13 may be completed by a computing device, such as the computing device 101 or any other computing device described herein. While the method 1300 of FIG. 13 will be described as being completed by the computing device 101 this is for example purposes only.

At 1310, an item of text data may be received. For example, the item of text data may be received by the computing device 101 (e.g., the background agent 117). For example, the item of text data may be received from the computing device 106 via the network 104 or another network. For example, a user, via the computing device 106 associated with the user, may input the item of text data in the computing device 106. For example, the item of text data may comprise a line of computer code, a database entry, a database query, or another form of data entry. The user may depress the "enter" key, another carriage return key, or submit the item of text data for entry at the computing device 106 in another manner.

For example, the background agent 117 may receive a user identifier associated with the item of text data from the computing device 106 via the network 104 or another network. For example, the user identifier may comprise a user ID, a user name, a device ID (e.g., a URL, a MAC address) or another form of identifier that identifier the user submitting the user data.

At 1320, one or more words in the item of text data may be determined. For example, the one or more words may be determined by the computing device 101 (e.g., the bearing generator 116). For example, the bearing generator 116 may evaluate each element (e.g., elements 505*a-j* of FIGS. 5-8) in the received item of text data (e.g., the item of text data 400 of FIG. 4) to determine the word elements (e.g., word element 405*c*) and the non-word elements (e.g., non-word elements 405*a-b* and 405*d*).

At 1330, a potential sensitive term may be determined to be in the item of text data. For example, the potential sensitive term may be determined by the computing device 101 (e.g., the background agent 117). For example, the sensitive term may be one or more of a secret, confidential data, or a password. For example, the potential sensitive term may be determined based on the one or more words and based on an evaluation of the item of text data (e.g., including the one or more words) by a trained model (e.g., the trained model 230).

For example, the potential sensitive term may be determined based on one or more suitable bearers. For example, the suitable bearers may be one or more of position bearing vectorization, assignment bearing vectorization, keyword bearing vectorization, threshold bearing vectorization, and password bearing vectorization. For example, position bearing vectorization may be used to determine the potential sensitive term based on a position of the one or more words within the item of text data. For example, the position of each of the one or more words may be determined based on a position bearing vectorization for the item of text data (e.g., the item of text data 400) as substantially described with reference to FIG. 5. The position bearing vectorization 500 for the item of text data 400 may be generated by the bearing generator 116. For example, position bearing vectorization on the item of text data 400 may facilitate an evaluation of the probability of a sensitive term in different positions within the item of text data 400.

For example, assignment bearing vectorization may be used to determine the potential sensitive term based on an arrangement of the one or more words in the item of text data 400. For example, the arrangement of the one or more words may be with reference to another word element or a non-word element. For example, the arrangement of the one or more words may be with reference to an assignment value within the item of text data 400. For example, an arrangement of the one or more words may be determined based on the assignment or arrangement bearing vectorization for the item of text data as substantially described with reference to FIG. 6. The assignment bearing vectorization for the item of text data may be generated by the bearing generator 116. For example, assignment bearing vectorization on the item of text data 400 may facilitate an evaluation of the arrangement of elements 505*a*-505*j* within the item of text data 400.

For example, keyword bearing vectorization may be used to determine the potential sensitive term based on keywords within the item of text data 400 and associated with the programming language or syntax used for the item of text data. For example, the keywords within the item of text data may be determined based on a keyword bearing vectorization for the item of text data (e.g., the item of text data 400) as substantially described with reference to FIG. 7. For example, threshold bearing vectorization may be used to determine the potential sensitive term based on an n-gram threshold used to evaluate the item of text data. For example, the n-gram threshold may be used to generate a threshold bearing vectorization for the item of text data 400 as substantially described with reference to FIG. 8. For example, password bearing vectorization may be used to determine the potential sensitive term based on one or more common passwords within the item of text data 400. For example, the common passwords within the item of text data may be determined based on a password bearing vectorization for the item of text data 400 as substantially described above.

Depending on which bearers are determined to be suitable (as discussed in FIG. 9) for the trained model, the computing device 101 (e.g., the bearing generator 116) may transform the item of text data into a vector form as described above. For the example item of text data 400 of int[ ] secretto-ken={13, 14, 15}, whereby the position bearing vectorization, the assignment bearing vectorization, the keyword bearing vectorization, and the threshold vectorization are identified as the suitable bearers for the trained model may generate the following vector form for the item of text data 400: [1-111, 2-112, 3-113, 4-101, 5-012, 6-113, 7-101, 8-102, 9-103, 10-111]. This vector form of the item of text data 400 may be evaluated by the trained model 230 to determine if the item of text data includes a potential sensitive term. The vector form of the item of text data 400 may be evaluated by the trained model 230 to determine a probability that the item of text data 400 comprises a possible sensitive term and the identity of the possible sensitive term. For example, the trained model 230 may determine that the item of text data includes a possible sensitive term if the probability that a particular element 505a-j of the item of text data 400 is a sensitive term satisfies a model threshold (e.g., is greater than or greater than or equal to the model threshold).

At 1340, an indication of the potential sensitive term may be output or caused to be output. For example, the indication may be output or caused to be output by the computing device 101 (e.g., the background agent 117). For example, the indication for the potential sensitive term may be caused to be output on a display associated with the computing device 106. For example, the indication of the potential sensitive term may comprise the one or more elements for which the probability satisfied the model threshold. For example, the indication of the potential sensitive term may be sent from the background agent 117 to the computing device 106 via the network 104 or another network. For example, the indication of the potential sensitive term may comprise a text warning, such as "WARNING—the most recent item of text data entered may include a sensitive term," or other similar alert. For example, the indication of the potential sensitive term may comprise a sound (e.g., a beep, buzz, a siren, etc.) providing an audible output of the indication of the potential sensitive in the item of text data 400.

A determination may be made as to whether the user modified the item of text data 400 to remove the possible sensitive term. For example, the determination may be made by the background agent 117. For example, the background agent 117 may determine if the item of text data 400 is modified and if that modification removes the possible sensitive term. For example, the background agent 117 may receive a second input of the item of text data and may compare the item of text data 400 to the second input of the item of text data to determine if the second input of the item of text data matches portions of the item of text data 400 and/or if the identified possible sensitive term was removed or not included in the second input of the item of text data.

If the background agent 117 determines that the user does not modify the item of text data 400 to remove the possible sensitive term (e.g., a second input of the item of text data was not received that matches portions of the item of text data 400 with the possible sensitive term removed or modified or an indication is received from the computing device 106 that the item of text data 400 will not be modified (e.g., user selects a radio button indicating no modification is needed)) a penalty counter variable may be incremented by the background agent 117. For example, the penalty counter variable may represent the number of false positive indications of a sensitive term within a received item of text data when evaluated using the trained model 230. For example, the penalty counter variable may be incremented or increased by a value of one when the background agent 117 determines that the user does not modify the item of text data 400 to remove or modify the potential sensitive term.

The penalty counter variable may be compared to a penalty threshold to determine if the penalty counter variable satisfies (e.g., is greater than or greater than or equal to) the penalty threshold. For example, based on the penalty counter variable satisfying the penalty threshold, the trained sensitive term detection model (e.g., the trained model 230) may be retrained based on additional items of text data. For example, the additional items of text data may be associated only with the user that input the item of text data or with a plurality of users who have submitted a plurality of additional items of text data.

For example, if the background agent 117 determines that the user modified the item of text data 400 to remove or modify the possible sensitive term, then the possible sensitive term may be determined to be a sensitive term. For example, a representation of the determined sensitive term may be generated (e.g., by the background agent 117). For example, the representation may be any one or more of the determined sensitive term, a singular version of the determined sensitive term, a plural version of the determined sensitive term, a gender-neutral form of the determined sensitive term, a form of the determined sensitive term that removes any prefixes or suffixes from the determined sensitive term, or the like. For example, the representation of the determined sensitive term may be embedded into the document, code, text data, or software being evaluated. The representation may be used, for example by the background agent 117, to determine other sensitive terms in the text data. For example, the background agent 117 may compare the representation to additional text within the text data in order to identify additional sensitive terms. For example, if any of the additional text matches or substantially matches (e.g. the base portion of the word in the additional text matches the base portion of the representation, such as plural and singular versions of the word would be a substantial match) the representation, the additional text data may be determined or indicated as a potential sensitive term and handled as described above in 1015-1020 or may automatically be determined to be a sensitive term by the background agent 117.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:

receiving, by a computing device, text data;

determining, based on the text data, one or more words in the text data;

determining, by a trained machine-learning model and based on an arrangement of a first word of the one or more words with reference to a second word of the one or more words, a potential sensitive term in the text data; and causing output of an indication of the potential sensitive term.

2. The method of claim 1, further comprising:
determining, based on the text data, a position for the one or more words within the text data,
wherein determining the potential sensitive term is further based on the position for the one or more words within the text data.

3. The method of claim 1, wherein the text data comprises a line of computer code.

4. The method of claim 1, further comprising:
receiving an indication that the potential sensitive term is not a sensitive term; and
updating, based on the potential sensitive term not being a sensitive term, an error variable.

5. The method of claim 4, further comprising:
determining that the error variable satisfies an error threshold; and
retraining the trained machine-learning model for detecting potential sensitive terms.

6. The method of claim 1, further comprising:
receiving user data identifying a user associated with the text data,
wherein determining the potential sensitive term is further based on the user associated with the text data.

7. The method of claim 1, wherein the potential sensitive term is one of a secret term, a confidential term, or a password.

8. The method of claim 1, further comprising:
receiving modified text data, wherein the modified text data does not comprise the potential sensitive term; and
determining, based on the modified text data not comprising the potential sensitive term, that the potential sensitive term is a sensitive term.

9. The method of claim 1, further comprising:
determining, the potential sensitive term is a sensitive term;
generating a representation of the sensitive term; and
comparing the representation to additional terms to identify additional sensitive terms.

10. A method comprising:
receiving, by a computing device, text data;
determining, based on the text data, one or more words in the text data;
determining, by a trained machine-learning model and based on a position of a first word of the one or more words with reference to a second word of the one or more words in the text data, a potential sensitive term in the text data; and
causing output of an indication of the potential sensitive term.

11. The method of claim 10, further comprising:
determining an arrangement of the one or more words in the text data,
wherein determining the potential sensitive term is further based on the arrangement of the one or more words in the text data.

12. The method of claim 10, wherein the text data comprises the one or more words and one or more non-word elements, wherein the method further comprises determining, based on the text data, a position for each of the one or more words and the one or more non-word elements in the text data.

13. The method of claim 10, further comprising:
receiving an indication that the potential sensitive term is not a sensitive term; and
updating, based on the potential sensitive term not being the sensitive term, an error variable.

14. The method of claim 13, further comprising:
determining that the error variable satisfies an error threshold; and
retraining the trained machine-learning model for detecting potential sensitive terms.

15. The method of claim 10, further comprising:
receiving user data identifying a user associated with the text data,
wherein determining the potential sensitive term is further based on the user associated with the text data.

16. The method of claim 10, further comprising:
receiving modified text data, wherein the modified text data does not comprise the potential sensitive term; and
determining, based on the modified text data not comprising the potential sensitive term, that the potential sensitive term is a sensitive term.

17. The method of claim 10, wherein the potential sensitive term is one of a secret term, a confidential term, or a password.

18. The method of claim 10, further comprising:
determining, the potential sensitive term is a sensitive term;
generating a representation of the sensitive term; and
comparing the representation to additional words in the text data to identify additional sensitive terms in the text data.

19. A method comprising:
receiving, by a computing device, text data;
determining, based on the text data, one or more words in the text data;
determining, by a trained machine-learning model and based on a position of a word of the one or more words, a potential sensitive term in the text data; and
causing output of an indication of the potential sensitive term.

20. The method of claim 19, further comprising:
determining an arrangement of the one or more words in the text data,
wherein determining the potential sensitive term is further based on the arrangement of the one or more words in the text data.

21. The method of claim 19, further comprising:
determining, based on the text data, a position for the one or more words within the text data,
wherein determining the potential sensitive term is further based on the position for the one or more words within the text data.

* * * * *